United States Patent
Kolling et al.

(10) Patent No.: US 12,025,987 B2
(45) Date of Patent: Jul. 2, 2024

(54) TURN-MINIMIZING OR TURN-REDUCING ROBOT COVERAGE

(71) Applicant: iRobot Corporation, Bedford, MA (US)

(72) Inventors: Andreas Kolling, Pasadena, CA (US); Isaac Vandermeulen, Manchester (GB)

(73) Assignee: iRobot Corporation, Bedford, MA (US)

(*) Notice: Subject to any disclaimer, the term of this patent is extended or adjusted under 35 U.S.C. 154(b) by 187 days.

(21) Appl. No.: 16/565,721

(22) Filed: Sep. 10, 2019

(65) Prior Publication Data
US 2020/0089255 A1   Mar. 19, 2020

Related U.S. Application Data

(60) Provisional application No. 62/731,644, filed on Sep. 14, 2018.

(51) Int. Cl.
G05D 1/02     (2020.01)
B25J 11/00    (2006.01)
G05D 1/00     (2024.01)

(52) U.S. Cl.
CPC ........ G05D 1/0274 (2013.01); B25J 11/0085 (2013.01); G05D 1/0219 (2013.01); *A47L 2201/04* (2013.01)

(58) Field of Classification Search
CPC ............... G05D 1/0274; G05D 1/0219; G05D 2201/0203; G05D 2201/0215; B25J 11/085; A47L 2201/04
See application file for complete search history.

(56) References Cited

U.S. PATENT DOCUMENTS

| | | | | |
|---|---|---|---|---|
| 6,934,615 B2* | 8/2005 | Flann | ................. | A01B 69/008 172/2 |
| 8,498,788 B2* | 7/2013 | Kondekar | ............ | G05D 1/0219 701/50 |
| 9,528,836 B2* | 12/2016 | Aas | ........................ | G01C 21/20 |
| 9,933,787 B2* | 4/2018 | Story | .................. | G05D 1/0217 |

(Continued)

OTHER PUBLICATIONS

Acar, Ercan U, "Morse Decompositions for Coverage Tasks", The International Journal of Robotics Research, (Apr. 2002), 14 pgs.

(Continued)

*Primary Examiner* — Bhavesh V Amin
(74) *Attorney, Agent, or Firm* — Schwegman Lundberg & Woessner, P.A.

(57) ABSTRACT

Described herein are systems and methods for operating a mobile robot in an environment according to a coverage path generated using an environment map. The path includes a set of linear path segments connected by a number of turns therebetween, and the path minimizes or reduces the number of turns that the robot makes as it traverses the environment. An exemplary system includes at least one controller that partitions the environment map into regions with respective orientations based on the region's dimensional information and neighboring regions' properties, decomposes the regions into parallel ranks, and generates a coverage path using the ranks. One or more mobile robots can accomplish designated missions such as cleaning in the environment when moving along their respectively identified path.

20 Claims, 21 Drawing Sheets

(56) References Cited

U.S. PATENT DOCUMENTS

| | | | |
|---|---|---|---|
| 10,353,399 B2* | 7/2019 | Ebrahimi Afrouzi | ............... G05D 1/0219 |
| 10,649,457 B2* | 5/2020 | Foster | ............ G06N 20/00 |
| 10,729,055 B2* | 8/2020 | Foster | ............ A01B 69/008 |
| 2016/0174459 A1* | 6/2016 | Balutis | ............ G05D 1/0234 701/25 |

OTHER PUBLICATIONS

Agmon, Noa, "The giving tree: constructing trees for efficient offline and online multi-robot coverage", Ann Math Artif Intell Springer Science + Business Media B.V., (Mar. 18, 2009), 26 pgs.

Ahmadi, Mazda, "A Multi-Robot System for Continuous Area Sweeping Tasks", Proceedings 2006 IEEE International Conference on Robotics and Automation, (2006), 6 pgs.

Arkin, Esther M, "Approximation algorithms for lawn mowing and milling", Computational Geometry 17, (2000), 26 pgs.

Avellar, Gustavo S.C., "Multi-UAV Routing for Area Coverage and Remote Sensing with Minimum Time", Sensors 2015, 15, (2015), 21 pgs.

Barrientos, Antonio, "Aerial Remote Sensing in Agriculture: a Practical Approach to Area Coverage and Path Planning for Fleets of Mini Aerial Robots", Journal of Field Robotics 28(5), (2011), 23 pgs.

Bast, Hannah, "The Area Partitioning Problem", 12th Canadian Conference on Computational Geometry, (2000), 163-172.

Bochkarev, Stanislav, "On Minimizing Turns in Robot Coverage Path Planning", 2016 IEEE International Conference on Automation Science and Engineering (CASE), (2016), 6 pgs.

Choset, Howie, "Coverage Path Planning: the Boustrophedon Cellular Decomposition", Field and Service Robotics, (1997), 7 pgs.

Choset, Howie, "Coverage for robotics—a survey of recent results", Annals of Mathematics and Artificial Intelligence 31, (2001), 113-126.

Christofides, Nicos, "Worst-Case Analysis of a New Heuristic for the Travelling Salesman Problem", Managenecv Sciences Research Report se. 388, (Feb. 1976), 11 pgs.

Ding, Donghong, "A tool-path generation strategy for wire and arc additive manufacturing", International Journal of Advanced Manufacturing Technology, 73, (2014), 18 pgs.

Floyd, Robert W, "Algorithms", Communications of the ACM, (1962), 344-348.

Held, Martin, "On the Computational Geometry of Pocket Machining", (1991), 62 pgs.

Hert, Susan, "Polygon Area Decomposition for Multiple-Robot Workspace Division", International Journal of Computational Geometry and Applications vol. 08, No. 04,, (1998), 25 pgs.

Huang, Wesley H, "Optimal Line-sweep-based Decompositions for Coverage Algorithms", Proceedings of the 2001 IEEE International Conference on Robotics and Automation, (2001), 6 pgs.

Kapoutsis, Athanasios CH, "DARP: Divide Areas Algorithm For Optimal Multi-Robot Coverage Path Planning", Journal of Intelligent and Robotic Systems manuscript No. (2017), 16 pgs.

Karapetyan, Nare, "Efficient Multi-Robot Coverage of a Known Environment", 2017 IEEE RSJ International Conference on Intelligent Robots and Systems (IROS), (Sep. 2017), 7 pgs.

Kivelevitch, Elad, "A Hierarchical Market Solution to the Min-Max Multiple Depots Vehicle Routing Problem", Unmanned Systems, vol. 2, No. 1, (2014), 15 pgs.

Kong, Chan, "Distributed Coverage with Multi-Robot System", Proceedings of the 2006 IEEE International Conference on Robotics and Automation, (May 2006), 7 pgs.

Li, Yan, "Coverage path planning for UAVs based on enhanced exact cellular decomposition method", Mechatronics 21, (2011), 876-885.

Lin, S, "An Effective Heuristic Algorithm for the Traveling-Salesman Problem", Operations Research, vol. 21, No. 2, (1973), 498-516.

Maza, Ivan, "Multiple UAV cooperative searching operation using polygon area decomposition and efficient coverage algorithms", Distributed Autonomous Robotic Systems 6, (2007), 10 pgs.

Papadimitriou, Christos H., "The Euclidean Traveling Salesman Problem IS NP-Complete", Theoretical Computer Science 4, (1977), 237-244.

Rekleitis, Ioannis, "Efficient Boustrophedon Multi-Robot Coverage: an algorithmic approach", Ann Math Artif Intell 52, (2008), 109-142.

Sheng, Weihua, "Surface Partitioning in Automated CAD-Guided Tool Planning for Additive Manufacturing", Int. Conference on intelligent Robots and Systems, (2003), 2072-2077.

Wang, Yongzhen, "Memetic algorithm based on sequential variable neighborhood descent for the minmax multiple traveling salesman problem", Computers and Industrial Engineering 106, (2017), 105-122.

Welzl, Emo, "Constructing the Visibility Graph for n-LINE Segments In O(n2) Time", Information Processing Letters 20, (May 10, 1985), 167-171.

Xu, Anqi, "Efficient complete coverage of a known arbitrary environment with applications to aerial operations", Auton Robot 36, (2014), 365-381.

* cited by examiner

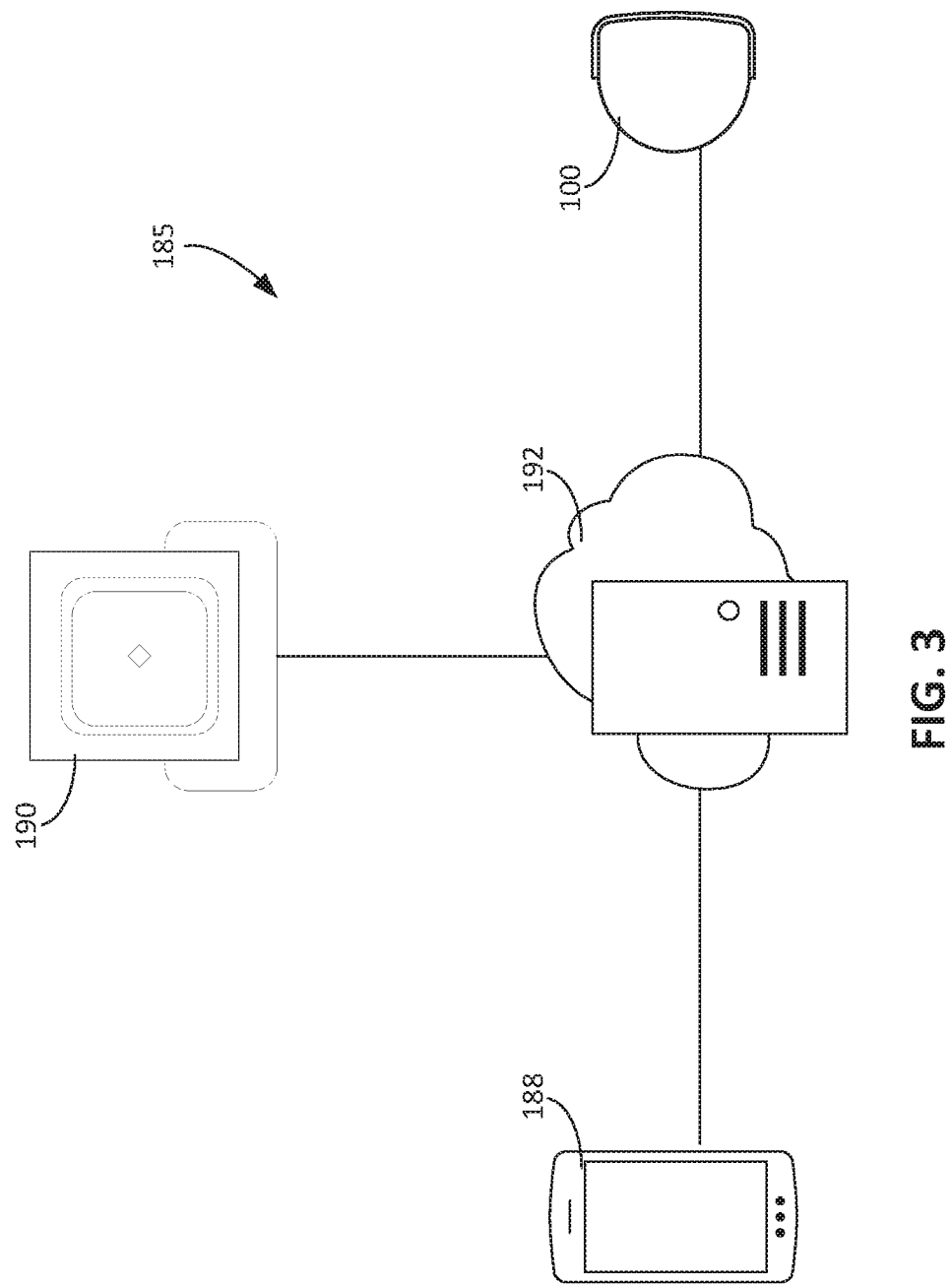

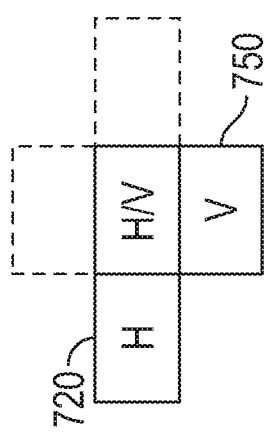
FIG. 7A
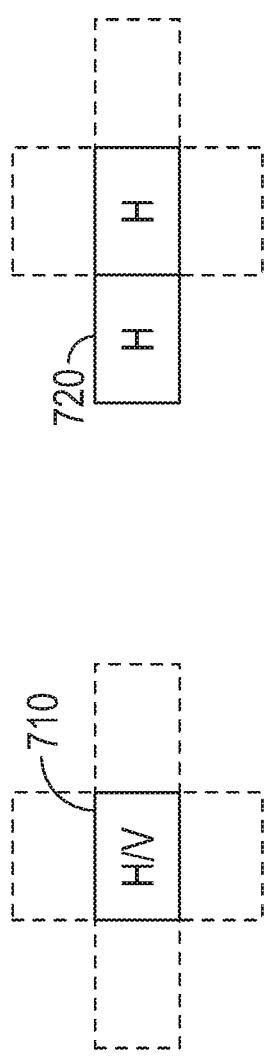
FIG. 7B
FIG. 7C
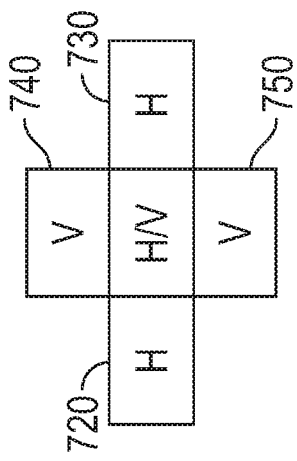
FIG. 7D
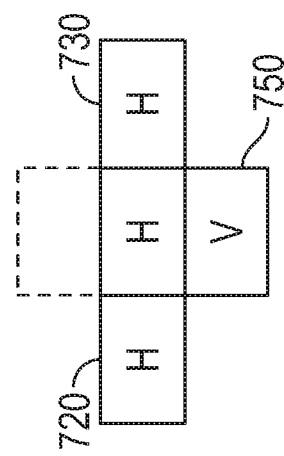
FIG. 7E
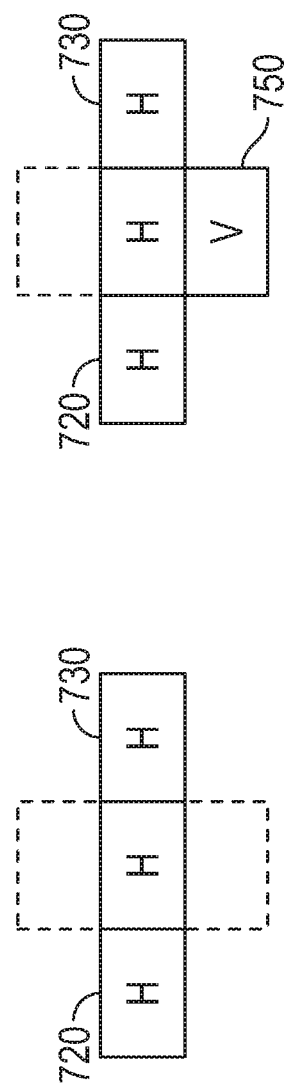
FIG. 7F

Algorithm 1: Orient rectangles

Input: Checkerboard partition, $\mathcal{P} = \{r_1, \ldots, r_N\}$
Output: Coverage orientations $o : \mathcal{P} \to \{H, V\}$ 1    $o \leftarrow$ Random orientations
2    bias $\leftarrow$ random orientation (H or V)
3    while True do
4        Set all rectangles to unchecked
5        Improvement $\leftarrow$ False
6        while there are unchecked rectangles do
7            $r \leftarrow$ random unchecked rectangle
8            $L \leftarrow \{$locally optimal orientations for $r\}$
9            if $|L| = 2$ and $o(r) \neq$ bias then
10               Flip $o(r)$
11               Set $r$'s neighbors to unchecked
12            else if $|L| = 1$ and $o(r) \notin L$ then
13               Flip $o(r)$
14               Set $r$'s neighbors to unchecked
15               Improvement $\leftarrow$ True
16            else
17               Set $r$ to checked
18        if Improvement then
19            Flip bias
20        else
21            Return $o$

FIG. 8

TURN-MINIMIZING OR TURN-REDUCING
ROBOT COVERAGE

PRIORITY APPLICATION

This application claims the benefit of priority to U.S. Provisional Patent Application Ser. No. 62/731,644, filed Sep. 14, 2018, the content of which is incorporated herein by reference in its entirety.

TECHNICAL FIELD

This document relates generally to mobile robots and, more particularly, to systems, devices, and methods for planning path for robots to cover an environment.

BACKGROUND

Autonomous mobile robots can move about a surface in an environment. Examples of the autonomous mobile robots include cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves.

Robot coverage generally refers to planning a path for a mobile robot in an environment, such that the robot's tool (e.g., a cleaning brush, a mopping pad, a rotating blade, or a camera) passes over every point of the environment at least once. Examples of the coverage include lawn mowing, painting, milling, vacuuming, mopping, plowing, and surveillance, among others. As the mobile robot moves, its tool traces out a two-dimensional region. Among others, one goal of coverage is to find a path such that the robot's tool covers a required area (e.g., an entirety of the environment or a portion therefore) as it traverses along the path while minimizing or reducing the time needed to accomplish the coverage.

OVERVIEW

Robot travel time needed to cover an environment can depend on size, shape, and topology of the environment, as well as motions of the robot such as speed, acceleration, and the number of turns the robot makes as it traverses environment. In particular, acceleration and deceleration of a robot has a large impact on the time it takes for traversing the environment. For example, when a robot makes a turn (a change in direction of motion), it typically needs to decelerate before, and accelerate after making the turn. As such, robots generally move faster when traveling in a straight line than when making a turn. The present document discusses systems, devices, and methods of operating a mobile robot by identifying a coverage path for at least one mobile robot to traverse an environment using an environment map. The path includes a set of linear path segments connected by a number of turns therebetween. The path minimizes or reduces the number of turns that the robot makes as it traverses the environment. An exemplary system includes at least one controller that partitions the environment map into regions with respective orientations based on the region's dimensional information and neighboring regions' properties, decomposes the regions into parallel ranks, and generates a coverage path using the ranks. The coverage path may include a set of linear path segments connected by a number of turns therebetween, and the determination of the path reduces the number of turns in the path. The controller may automatically update the coverage path in response to a user's modification of the environment map, such as by adding or removing a keep-out zone or a duplicate traversal zone. One or more mobile robots can accomplish designated missions such as cleaning in the environment when moving along their respectively identified path.

Example 1 is a system comprising at least one controller configured to receive information of an environment, and determine a path for a mobile robot to traverse at least a portion of the environment using the received environment information. The path may include a set of linear path segments connected by a number of turns therebetween, and the determination of the path reduces the number of turns in the path compared with a path having at least one portion in a substantially orthogonal direction.

In Example 2, the subject matter of Example 1 optionally includes the received environment information that may include an environment map, and the at least one controller is configured to: partition the environment map into regions; determine, for each of a number of the partitioned regions, a corresponding orientation representing a direction for the mobile robot to traverse the corresponding region; and determine the path for the mobile robot using the orientations of the number of the partitioned regions.

In Example 3, the subject matter of Example 2 optionally includes the orientation associated with a partitioned region that may include a first traversal direction, or a second traversal direction substantially orthogonal to the first traversal direction on the environment map.

In Example 4, the subject matter of any one or more of Examples 2-3 optionally includes the at least one controller that may be configured to determine the orientation associated with a partitioned region based at least on (1) a location of at least one neighboring region relative to the partitioned region, and (2) dimensional information of the at least one neighboring region.

In Example 5, the subject matter of any one or more of Examples 2-4 optionally includes the at least one controller that can be configured to: decompose each of the number of the partitioned regions into a set of parallel interior ranks each having a width substantially equal to a width of the mobile robot, the parallel interior ranks oriented in alignment with the orientation of the corresponding partitioned region; and determine the path for the mobile robot using the parallel interior ranks of the number of the partitioned regions.

In Example 6, the subject matter of Example 5 optionally includes the at least one controller that can be further configured to: generate one or more perimeter ranks along a boundary of the environment; and determine the path for the mobile robot further using the one or more perimeter ranks.

In Example 7, the subject matter of Example 6 optionally includes the at least one of the perimeter ranks that can interconnect (1) a first set of interior ranks in a first partitioned region and (2) a second set of interior ranks in a second partitioned region.

In Example 8, the subject matter of Example 7 optionally includes the first set of interior ranks orient in a different direction than the second set of interior ranks.

In Example 9, the subject matter of any one or more of Examples 1-8 optionally includes the mobile robot that can include: a drive system configured to drive the mobile robot to move along the determined path in the environment; and a cleaning system configured to clean the environment as the mobile robot moves along the determined path.

In Example 10, the subject matter of any one or more of Examples 1-9 optionally includes a remote device separate from and configured to communicate with the mobile robot, the remote device including a user interface configured to display a map of the environment and the determined path on the map.

In Example 11, the subject matter of Example 10 optionally includes the remote device that can include at least one of a local computer server, a cloud server, or a mobile phone.

In Example 12, the subject matter of any one or more of Examples 10-11 optionally includes the user interface that can be configured to receive a user instruction to modify the environment map; and wherein the remote device includes at least one of the at least one controller that is configured to modify the determined path using the modified environment map.

In Example 13, the subject matter of Example 12 optionally includes the user instruction that can include adding a keep-out traversable zone in the environment, and the at least one of the at least one controller is configured to remove a portion of the determined path corresponding to the keep-out zone.

In Example 14, the subject matter of any one or more of Examples 12-13 optionally includes the user instruction that can include adding a duplicate traversal zone in the environment, and the at least one of the at least one controller is configured to: determine, for the duplicate traversal zone, a set of parallel interior ranks oriented in a direction based at least on dimensional information of the duplicate traversal zone; and add to the determined path an additional path corresponding to the interior ranks for the duplicate traversal zone.

In Example 15, the subject matter of any one or more of Examples 12-14 optionally includes the user instruction that can include a user-specified robot traversal direction or pattern, and the at least one of the at least one controller is configured to modify the determined path using the user-specified robot traversal direction or pattern.

Example 16 is a mobile robot, comprising: a drive system; a memory configured to store a map of an environment; and a controller configured to determine a path for a mobile robot to traverse at least a portion of the environment using the stored environment map, the path including a set of linear path segments connected by a number of turns therebetween, and the determination of the path reduces the number of turns in the path; wherein the drive system is configured to drive the mobile robot to move in the environment according to the determined path.

In Example 17, the subject matter of Example 16 optionally includes a cleaning system that can be configured to clean the at least a portion of the environment as the mobile robot moves along the determined path.

In Example 18, the subject matter of any one or more of Examples 16-17 optionally includes the controller that can be configured to: partition the environment map into regions; determine, for each of a number of the partitioned regions, a corresponding orientation representing a direction for the mobile robot to traverse the corresponding region; and determine the path for the mobile robot using the orientations of the number of the partitioned regions.

In Example 19, the subject matter of Example 18 optionally includes the controller that can be configured to determine the orientation associated with a partitioned region based at least on (1) a location of at least one neighboring region relative to the partitioned region, and (2) dimensional information of the at least one neighboring region.

In Example 20, the subject matter of any one or more of Examples 18-19 optionally includes the controller that can be configured to: decompose each of the number of the partitioned regions into a set of parallel interior ranks each having a width substantially equal to a width of the mobile robot, the parallel interior ranks oriented in alignment with the orientation of the corresponding partitioned region, generate perimeter ranks along a boundary of the environment, at least one of the perimeter ranks interconnecting a first set of interior ranks in a first partitioned region and a second set of interior ranks in a second partitioned region; and determine the path for the mobile robot using the parallel interior ranks of the number of the partitioned regions and the perimeter ranks.

In Example 21, the subject matter of any one or more of Examples 18-20 optionally includes the controller that can be configured to update the determined path for the mobile robot in accordance with a user instruction of modifying the environment map.

Example 22 is a method of operating a mobile robot to traverse an environment. The method comprises steps of: receiving a map of the environment; determining, via at least one controller, a path for a mobile robot to traverse at least a portion of the environment using the received environment map, the path including a set of linear path segments connected by a number of turns therebetween, and the determination of the path reduces the number of turns in the path; and driving the mobile robot, via a drive system, to move along the determined path in the environment.

In Example 23, the subject matter of Example 22 optionally includes steps of partitioning the environment map into regions; and determining, for each of a number of the partitioned regions, a corresponding orientation representing a direction for the mobile robot to traverse the corresponding region; wherein determining the path for the mobile robot is based on the orientations of the number of the partitioned regions.

In Example 24, the subject matter of Example 23 optionally includes determining the orientation associated with a partitioned region based at least on (1) a location of at least one neighboring region relative to the partitioned region, and (2) dimensional information of the at least one neighboring region.

In Example 25, the subject matter of any one or more of Examples 23-24 optionally includes steps of: decomposing each of the number of the partitioned regions into a set of parallel interior ranks each having a width substantially equal to a width of the mobile robot, the parallel interior ranks oriented in alignment with the orientation of the corresponding partitioned region; and generating perimeter ranks along a boundary of the environment, at least one of the perimeter ranks interconnecting a first set of interior ranks in a first partitioned region and a second set of interior ranks in a second partitioned region; wherein determining the path for the mobile robot is based on the parallel interior ranks of the number of the partitioned regions and the perimeter ranks.

In Example 26, the subject matter of any one or more of Examples 23-25 optionally includes steps of: receiving a user instruction via a user interface to modify the environment map or to specify a robot traversal direction or pattern; and updating, via the at least one controller the determined path for the mobile robot in accordance with user instruction.

This Overview is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 3 is a diagram illustrating an example of a communication network in which a mobile robot operates.

FIGS. 7A-7F are diagrams illustrating examples of a rectangle orientation determined based on the rectangle's dimensions and its neighbors' orientations.

FIG. 8 illustrates an example of an algorithm for determining orientations of the partitioned rectangles.

DETAILED DESCRIPTION

Figure 1:
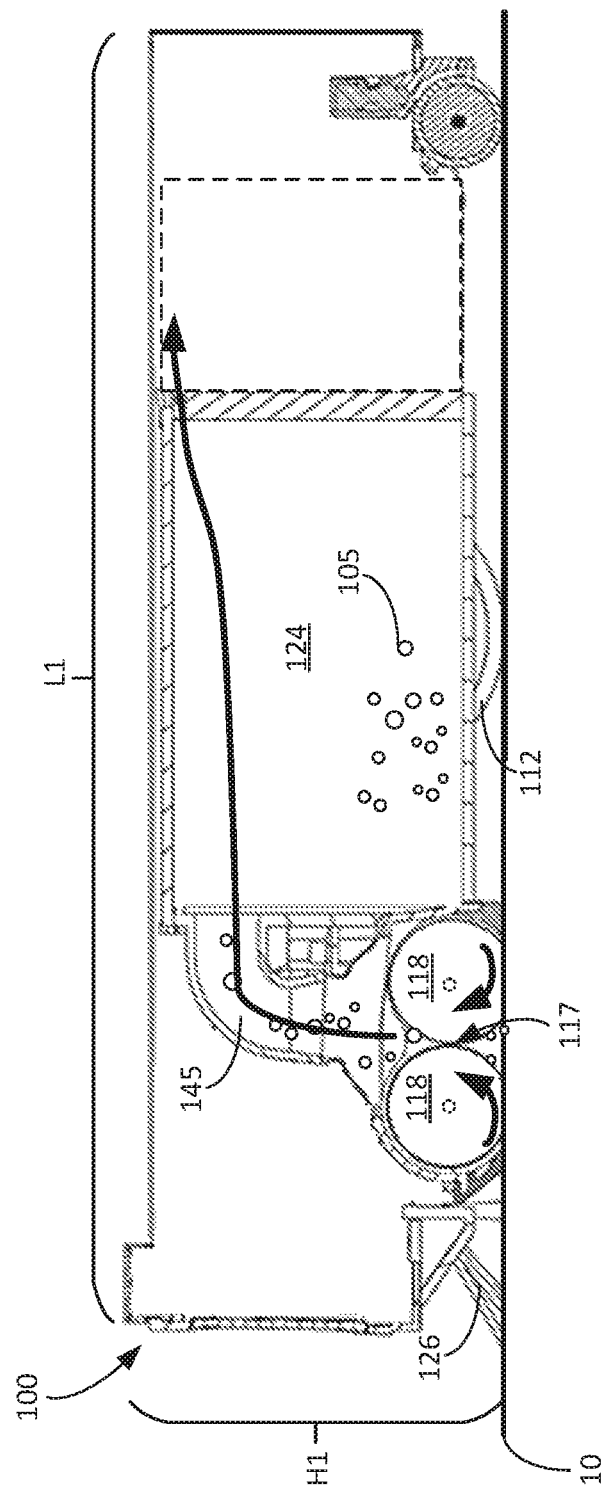
FIGS. 1, 2A, and 2B are side cross-sectional, bottom, and top perspective views of a mobile robot.

Robotic coverage and path planning in the art are generally based on an objective of minimizing or reducing the total distance traveled by the robot. This objective implicitly assumes the robot moves at a constant speed and can turn almost instantaneously. However, this assumption may not be true for real robots with non-holonomic constraints and imperfect localization. Many robots are slower at turning than moving in a linear path, at least because of the time spent on decelerating and accelerating before and after a turn. The actual time required for a robot to execute a path depends on not only that path's length, but also the amount of time it takes for the robot to turn. In this document, a turn is considered a motion between two straight segments of a robot's path that form an angle of approximately 180 degrees or other angles. By way of example, an "L" shaped area having two sub-regions with substantially perpendicular orientations D1 and D2 may be covered by a first coverage path P1 that has all path segments parallel to a single orientation (either D1 or D2), or be covered by a second coverage path P2 that includes a first set of path segments substantially parallel to the D1 orientation, and a second set of path segments substantially parallel to D2 orientation. Although the resulting paths P1 and P2 have optimal length, P1 may require a larger number of ranks, and thus more turns, than P2.

The present document discusses a path planner that explicitly considers turn minimization or reduction for single- or multi-robot coverage. According to various embodiments discussed herein, a robot environment, designated to one or more robots to traverse, may be approximated by a rectilinear polygon. Turns are minimized or reduced by partitioning the rectilinear polygonal environment into long unit-width rectangles called ranks. Perimeter ranks are parallel to the boundary of the environment, and interior ranks are oriented horizontally or vertically. The interior ranks are constructed using a novel heuristic that minimizes the number of ranks. The rank partition can be converted into a coverage path for a robot such as by solving a TSP, or coverage paths for a team of robots such as by solving a version of the minmax m-TSP.

Compared to conventional robotic path planning techniques, the present systems, devices, and methods advantageously minimize turns made by the robots using a novel asymptotically optimal partitioning heuristic that divides the environment into a minimal number of ranks that completely cover the environment, and planning paths for one or more robots by solving TSP or m-TSP, or a variant thereof, on a graph related to the set of ranks. Because robots generally can travel faster in linear path than making a turn, minimizing or reducing the number of the turns as discussed in this document can significantly reduce mission time in both single- and multi-robot applications. Fewer turns may also reduce the likelihood of a robot being stuck when making the turn, as well as improved localization. Additionally, because turns are generally associated with acceleration and deceleration that may consume more power, reduction in turns in a planned path as discussed in this document may help save battery power and improve operation efficiency.

In the following, mobile robot and its working environment are briefly discussed with reference to FIGS. 1-3. Detailed descriptions of systems, devices, and methods of coverage path planning, according to various embodiments described herein, are discussed with reference to FIGS. 4-15.

Examples of Autonomous Mobile Robots

Figure 2A:
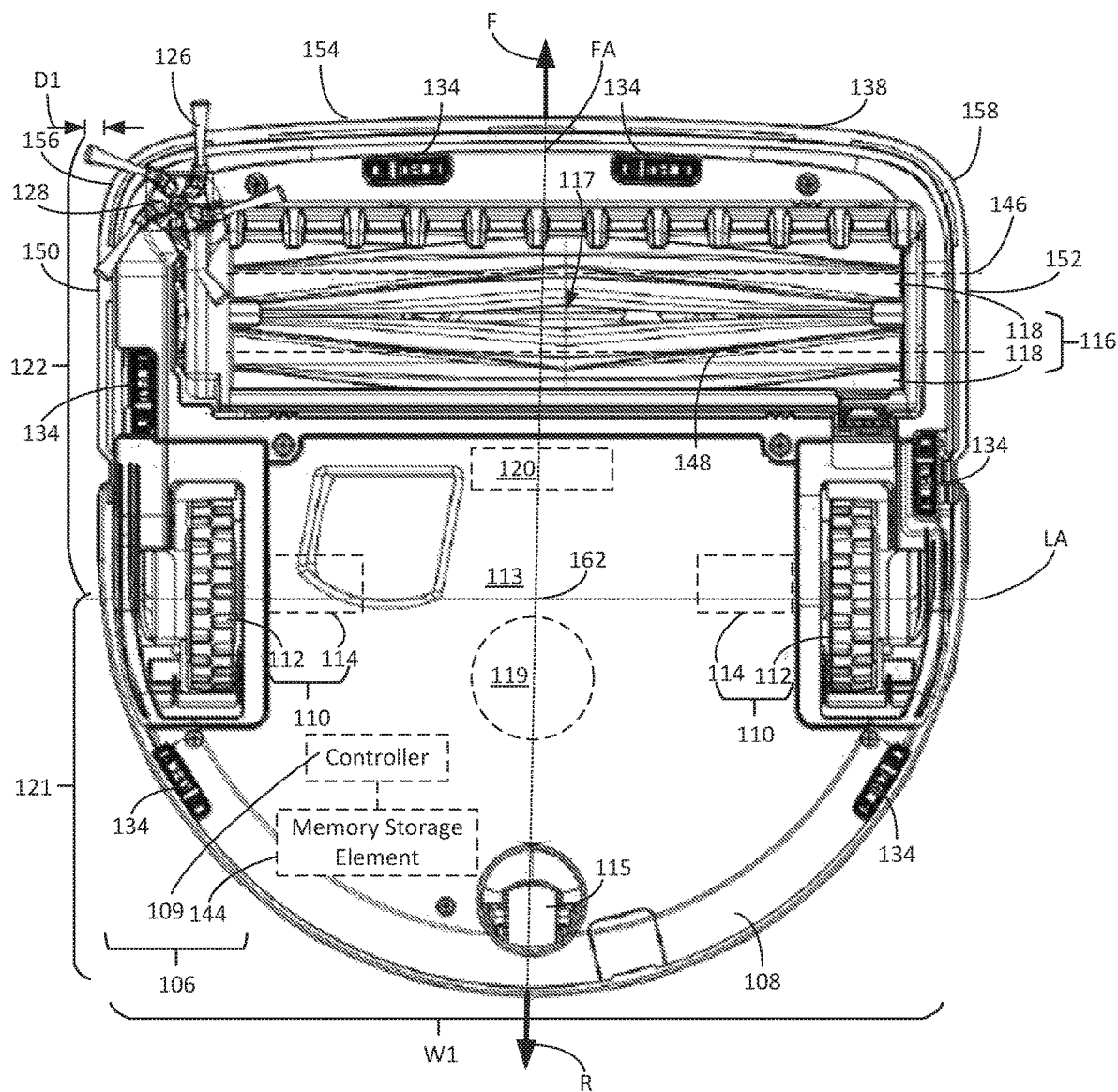
Figure 2B:
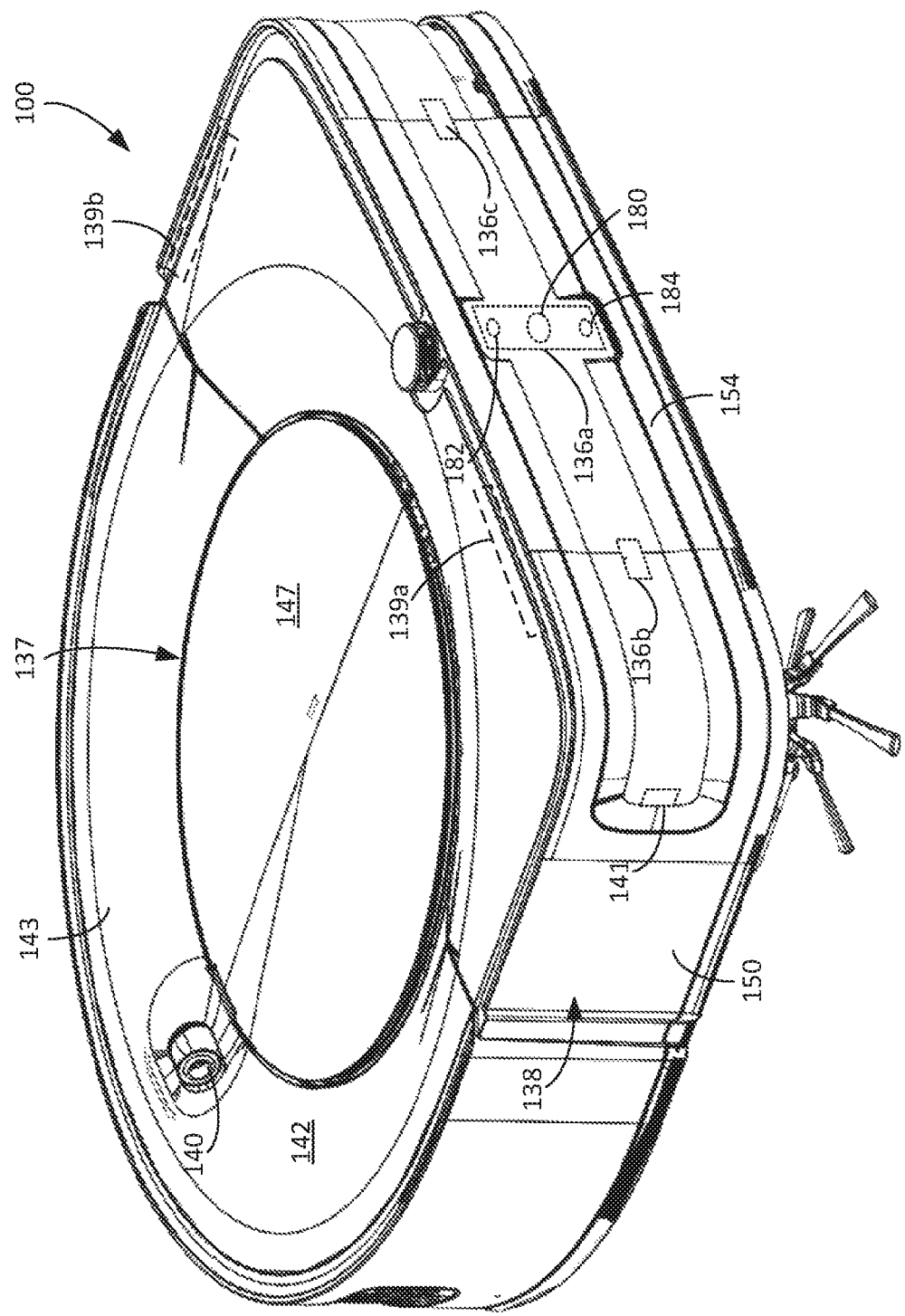

FIGS. 1 and 2A-2B depict different views of an example of the robot 100. Referring to FIG. 1, the robot 100 collects debris 105 from the floor surface 10 as the robot 100 traverses the floor surface 10. Referring to FIG. 2A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height HI (shown in FIG. 1) of the robot 100 relative to the floor surface is, for example, no more than 13 centimeters. The robot 100 is also compact. An overall length L1 (shown in FIG. 1) of the robot 100 and an overall width W1 (shown in FIG. 2A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 2A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 2B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portion 122 connect the side surface 150, 152 to the forward surface 154.

In the example depicted in FIGS. 1 and 2A-2B, the robot 100 is an autonomous mobile floor cleaning robot that includes a cleaning assembly 116 (shown in FIG. 2A) operable to clean the floor surface 10. For example, the robot 100 is a vacuum cleaning robot in which the cleaning assembly 116 is operable to clean the floor surface 10 by ingesting debris 105 (shown in FIG. 1) from the floor surface 10. The cleaning assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning assembly 116 includes one or more rotatable members, e.g., rotatable members 118 driven by a motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 1, the cleaning inlet 117 is positioned between the rotatable members 118.

As shown in FIG. 1, the rotatable members 118 are rollers that counter rotate relative to one another. For example, the rotatable members 118 can be rotatable about parallel horizontal axes 146, 148 (shown in FIG. 2A) to agitate debris 105 on the floor surface 10 and direct the debris 105 toward the cleaning inlet 117, into the cleaning inlet 117, and into a suction pathway 145 (shown in FIG. 1) in the robot 100. Referring back to FIG. 2A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 1), as the rotatable members 118 rotate relative to the housing infrastructure 108. The rotatable members 118 further contact the floor surface 10 to agitate debris 105 on the floor surface 10.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126 to rotate the brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 2A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning assembly and toward a portion of the floor surface 10 in front of the cleaning assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller 109 is configured to execute instructions to perform one or more operations as described herein. The memory storage element 144 is accessible by the controller 109 and disposed within the housing infrastructure 108. The one or more electrical sensors are configured to detect features in an environment of the robot 100. For example, referring to FIG. 2A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Referring to FIG. 2B, the sensor system includes one or more proximity sensors that can detect objects along the floor surface 10 that are near the robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment. In some implementations, the bump sensor 139a can be used to detect movement of the bumper 138 along the fore-aft axis FA (shown in FIG. 2A) of the robot 100, and the bump sensor 139b can be used to detect movement of the bumper 138 along the lateral axis LA (shown in FIG. 2A) of the robot 100. The proximity sensors 136a, 136b, 136c can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment of the robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b, 136c, and the obstacle following sensor 141 each includes an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacles surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180, e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The sensor system can further include sensors for tracking a distance travelled by the robot 100. For example, the sensor system can include encoders associated with the motors 114 for the drive wheels 112, and these encoders can track a distance that the robot 100 has travelled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance travelled by the robot 100 based on changes in floor features as the robot 100 travels along the floor surface 10.

The controller 109 uses data collected by the sensors of the sensor system to control navigational behaviors of the robot 100 during the mission. For example, the controller 109 uses the sensor data collected by obstacle detection sensors of the robot 100, e.g., the cliff sensors 134, the proximity sensors 136a, 136b, 136c, and the bump sensors 139a, 139b, to enable the robot 100 to avoid obstacles or to prevent from falling down stairs within the environment of the robot 100 during the mission. In some examples, the controller 109 controls the navigational behavior of the robot 100 using information about the environment, such as a map of the environment. With proper navigation, the robot 100 is able to reach a goal position or completes a coverage mission as efficiently and as reliably as possible. According to various embodiments discussed herein, the controller 109 may include a coverage planner configured to identify a coverage plan, such as a path, for the robot 100 to pass through the entirety, or a particular portion, of the environment at least once, while minimizing or reducing the total travel time. In this document, the path refers to a trajectory that includes a set of linear path segments connected by a number of turns between the linear path segments. The robot 100 makes a turn to switch from one linear path segment to another linear path segment. To reduce the total travel time of the robot 100, the coverage planner can identify a path that includes a set of linear path segments connected by a number of turns therebetween. The coverage planner can use the environment partitioning and path planning techniques according to various embodiments as discussed in this document to determine the path that reduces the number of turns compared with a path having at least one portion in a substantially orthogonal direction (such as in a range of approximately 80-100 degrees, or a range of approximately 60-120 degrees, between two portions of the path). In some example, a team of two or more robots can jointly cover the environment according to their respective paths. The coverage planner may identify the respective paths, such that the time taken by the slowest robot among the team of robots is minimized or reduced. Examples of the coverage planner and the methods of identifying a path with reduced number of turns are discussed below, such as with reference to FIGS. 4-15.

The sensor data can be used by the controller 109 for simultaneous localization and mapping (SLAM) techniques in which the controller 109 extracts features of the environment represented by the sensor data and constructs a map of the floor surface 10 of the environment. The sensor data collected by the image capture device 140 can be used for techniques such as vision-based SLAM (VSLAM) in which the controller 109 extracts visual features corresponding to objects in the environment and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map can be a persistent map that is usable and updateable by the controller 109 of the robot 100 from one mission to another mission to navigate the robot 100 about the floor surface 10. According to various embodiments discussed in this document, the persistent map can be updated in response to instruction commands received from a user. The controller 109 can modify subsequent or future navigational behaviors of the robot 100 according to the updated persistent map, such as by modifying the planned path or updating obstacle avoidance strategy. Examples of modifying planned path are discussed below, such as with reference to FIGS. 10-12.

The persistent data, including the persistent map, enables the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the environment using the persistent map to optimize paths taken during the missions.

The robot 100 can, in some implementations, include a light indicator system 137 located on the top portion 142 of the robot 100. The light indicator system 137 can include light sources positioned within a lid 147 covering the debris bin 124 (shown in FIG. 2A). The light sources can be positioned to direct light to a periphery of the lid 147. The light sources are positioned such that any portion of a continuous loop 143 on the top portion 142 of the robot 100 can be illuminated. The continuous loop 143 is located on a recessed portion of the top portion 142 of the robot 100 such that the light sources can illuminate a surface of the robot 100 as they are activated.

Examples of Communication Networks

FIG. 3 is a diagram illustrating by way of example and not limitation a communication network 185 that enables networking between the robot 100 and one or more other devices, such as a mobile device 188, an autonomous mobile robot 190, or a cloud computing system 192. Using the communication network 185, the robot 100, the mobile device 188, the robot 190, and the cloud computing system 192 can communicate with one another to transmit data to one another and receive data from one another. In some implementations, the robot 100, the robot 190, or both the robot 100 and the robot 190 communicate with the mobile device 188 through the cloud computing system 192. Alternatively or additionally, the robot 100, the robot 190, or both the robot 100 and the robot 190 communicate directly with the mobile device 188. Various types and combinations of wireless networks (e.g., Bluetooth, radio frequency, optical based, etc.) and network architectures (e.g., mesh networks) may be employed by the communication network 185.

In some implementations, the mobile device 188 as shown in FIG. 3 is a remote device that can be linked to the cloud computing system 192 and can enable a user to provide inputs on the mobile device 188. The mobile device 188 can include user input elements such as, for example, one or more of a touchscreen display, buttons, a microphone, a mouse, a keyboard, or other devices that respond to inputs provided by the user. The mobile device 188 alternatively or additionally includes immersive media (e.g., virtual reality) with which the user interacts to provide a user input. The mobile device 188, in these cases, is, for example, a virtual reality headset or a head-mounted display. The user can provide inputs corresponding to commands for the mobile robot 188. In such cases, the mobile device 188 transmits a signal to the cloud computing system 192 to cause the cloud computing system 192 to transmit a command signal to the mobile robot 100. In some implementations, the mobile device 188 can present augmented reality images. In some implementations, the mobile device 188 is a smartphone, a laptop computer, a tablet computing device, or other mobile device.

According to various embodiments discussed herein, the mobile device 188 may include a user interface configured to display a map of the robot environment. Robot path, such as that identified by the coverage planner of the controller 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 185 can include additional nodes. For example, nodes of the communication network 185 can include additional robots. Alternatively or additionally, nodes of the communication network 185 can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 185 depicted in FIG. 3 and in other implementations of the communication network 185, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Examples of Coverage Planner and Path Identification

The robot 100 can be controlled such as via the controller 109 in certain manners in accordance with the methods and processes described herein, such as coverage planning as discussed below with reference to FIGS. 4-9. While some operations of these processes may be described as being performed by the robot 100, by a user, by a computing device, or by another actor, these operations may, in some implementations, be performed by actors other than those described. For example, an operation performed by the robot 100 can be, in some implementations, performed by the cloud computing system 192 or by another computing device (or devices). In other examples, an operation performed by the user can be performed by a computing device. In some implementations, the cloud computing system 192 does not perform any operations. Rather, other computing devices perform the operations described as being performed by the cloud computing system 192, and these computing devices can be in direct (or indirect) communication with one another and the robot 100. In some implementations, the robot 100 can perform, in addition to the operations described as being performed by the robot 100, the operations described as being performed by the cloud computing system 192 or the mobile device 188. Other variations are possible. Furthermore, while the methods, processes, and operations described herein are described as including certain operations or sub-operations, in other implementations, one or more of these operation or sub-operations may be omitted, or additional operations or sub-operations may be added.

The coverage planning for one or more robots can include an environment partitioning and path planning. The environment can refer to the environment of which a robot can explore to accomplish a designated mission (e.g., cleaning, mopping, mowing, etc.). The environment information may be represented by an environment map, such as captured by a camera, or received as an input to the robot controller. In an example, the camera can be incorporated into the robot. In another example, the camera may be separate from, and communicatively coupled to the robot controller.

Partition of Robot Operating Environment

The environment partitioning concerns decomposing the environment into regions of particular shapes and sizes suitable for robot to traverse. In an example, the environment can be partitioned into convex regions that can be covered by back-and-forth motion of a robot. The partitioned region can be further split into rectangles called ranks. Each rank has a unit width, such as equal to the width of the robot's tool (e.g., sweeping, mopping, or mowing tools) and can be arbitrarily long. The robot can cover a single rank with a linear motion, and make a turn when it transits from one rank to another. Therefore, the number of turns that a robot can make as it covers the environment equals to the number of ranks. By partitioning the environment in a manner that result in least number of ranks, the coverage planner of the controller 109 can identify a path with reduced number of turns.

The floor surface of the robot environment, in many cases, has a shape of polygon, or can be approximated by a polygon. FIG. 4A illustrates, by way of example and not limitation, a two-dimensional polygona map 400A (denoted by E) of an I environment for a mobile robot, such as the robot 100, to traverse. The environment 400A includes an interior region 410 (also referred to as a positive area, denoted by $E_I$) and a boundary 420. The interior region 410 can be an unobstructed or slightly obstructed open area traversable by the robot. The polygonal map 400A can be a persistent map created using information captured by a camera (such as one incorporated into the robot 410) and stored in the memory 144. The coverage planner of the controller 109 can receive the polygonal map 400A, partition the interior region 410 into multiple convex regions, and assign interior ranks to the convex regions in a way to minimize or reduce the number of turns, as discussed further in the following.

In some examples, the polygonal map 400A may include a negative area 430, such as within the interior region 410. Examples of the negative area 430 may include an obstacle, a keep-out zone, or a dangerous area as specified by a user. The coverage planner of the controller 109 performs interior region partition and path planning such that no partitioned region covers, and no path crosses through, the negative area 430 or a portion thereof.

In addition to the partitioning of the interior region 410, the coverage planner of the controller 109 can generate one or more perimeter ranks, such as perimeter ranks 422 along at least a portion of the boundary 420, and perimeter ranks 432 along at least a portion of the boundary of the negative area 430. The perimeter ranks are paths the robot follows to clean the boundary of an area (e.g. along walls or boundaries of the negative area 430). Due to the geometry of the robot and the geometry of the boundary 420 or the negative area 430, there are certain areas of the environment 440A (such as a corner proximal to the boundary 420 or the negative area 430) that may not be completely covered by any interior ranks. To ensure complete coverage of these areas, the robot may follow the perimeter ranks 432 or the perimeter ranks 422. As to be discussed in the following, the perimeter ranks can interconnect the interior ranks of one partitioned interior region to the interior ranks of another partitioned interior region.

When the robot is constrained to the environment as shown in polygonal map 440A, perimeter ranks can help achieve nearly complete coverage. In the case of a polygonal map 440A where the boundary comprises multiple connected linear edges as illustrated in FIG. 4A, the perimeter ranks 422 and 432 can each include one rank per edge of the boundary. Example of the edges of the boundary may include a wall, a door, a side of an area rug, edges of a kitchen island, etc. If two edges come together at an obtuse angle (between $\pi/2$ and $\pi$), such as an angle 451, the perimeter ranks can each be the same length as the corresponding edges. If the angle between edges is an acute angle (less than $\pi/2$), such as an angle 452, then the perimeter ranks can be shorter than the length of the corresponding edges such that the robot does not exit the environment. If the angle between edges is greater than x, such as an angle 453, then the perimeter rank can be extended by the width of the robot so that there is no missed space around the corner formed by the edges. As illustrated in FIG. 4A, to ensure complete coverage, adjacent perimeter ranks can be at least partially overlapped to each other.

Figure 4B:
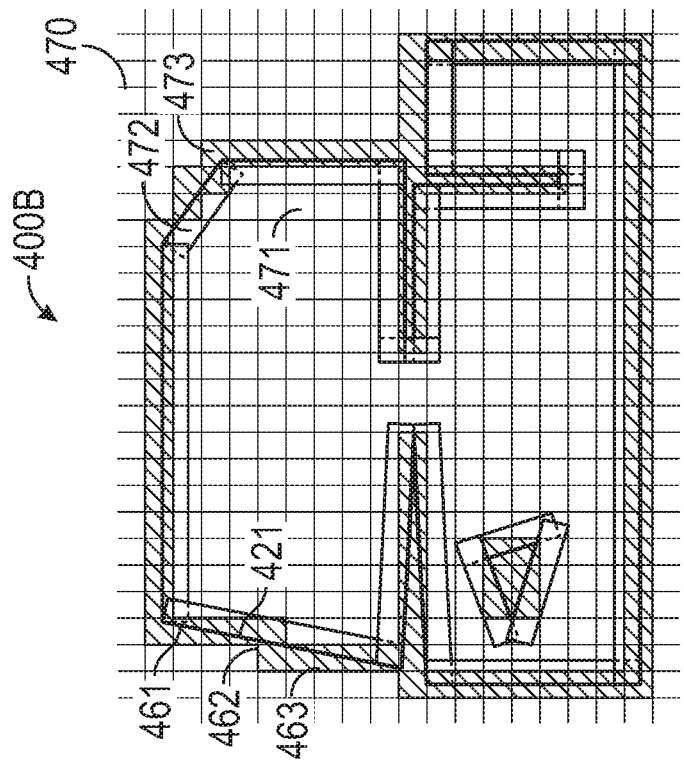
FIGS. 4B-4C are diagrams illustrating a rectilinear contracted polygon constructed from, and approximating, the polygonal map shown in FIG. 4A.
Figure 4A:
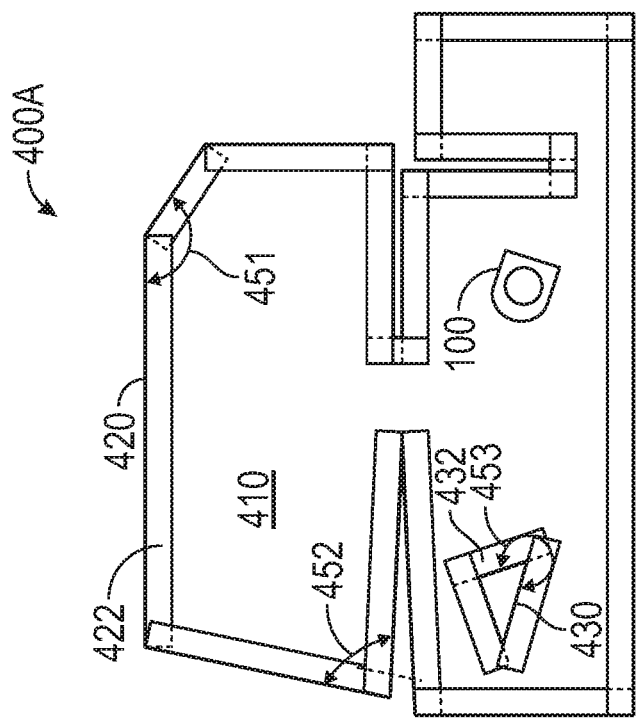
FIG. 4A is a diagram illustrating a two-dimensional polygonal map of an environment for a mobile robot to cover.

To partition the interior region 410 of the polygonal map 400A into multiple convex regions, a contracted polygon 400B (denoted by $E_C$) can be constructed based on the polygonal map 400A, as illustrated in FIG. 4B. The contracted polygon 400B covers the environment as shown in the polygonal map 400A, and has rectilinear edges. An angular edge (e.g., edge 421) can be replaced by a set of rectilinear edges (e.g., edges 461, 462, and 463) of the contracted polygon 400B. The resultant contracted polygon 400B has a shape of a rectilinear polygon. The construction of the rectilinear polygon facilitates partitioning of the contraction region 400B into a set of rectangles.

The rectilinear contracted polygon 400B can be obtained by projecting the polygonal map 400A onto a discretized grid 470. The grid 470 is composed of a set of rectangular or squared cells each having a unit width, such as a width of the robot's tool (e.g., sweeping, mopping, or mowing tools). The projection of the polygonal map 400A to the grid 470 may include three degrees of freedom of motion: up-down translation, left-right translation, and rotation of the grid 470 relative to the polygonal map 400A. In an example, the grid 470 may be rotated to maximize the length of the perimeter that aligns with the grid. The choice of translational parameters can be chosen arbitrarily.

Once a grid has been chosen, the rectilinear contracted polygon 400B can be computed in one of two ways. In a first approached, a largest $E_C$ can be determined as a union of all grid cells fully contained in the polygonal map 400A (E). In a different second approach, a smallest $E_C$ can be determined as a union of all grid cells fully or partially contained in the interior region 410 ($E_1$). These two definitions would result in different contracted polygon 400B if a cell is partially contained in $E_1$ but not fully contained in E. FIG. 4C is a diagram illustrating the largest $E_C$ 400C fully contained in the polygonal map 400A, determined by the grid 470.

Figure 5C:
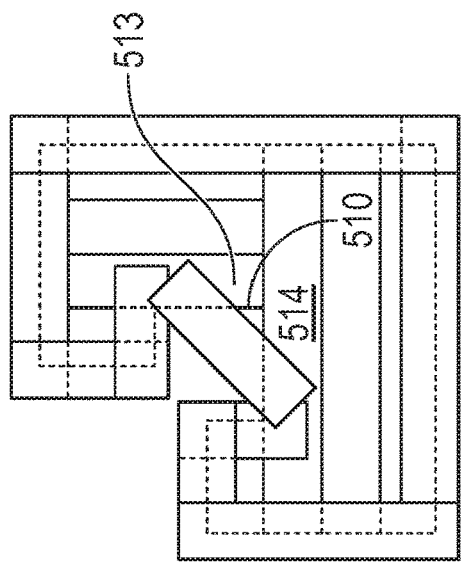
FIGS. 5A-5C are diagrams illustrating examples of covering an area not covered by interior ranks or perimeter ranks.
Figure 5B:
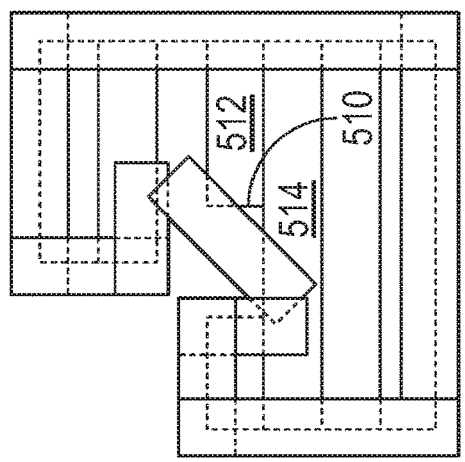
Figure 5A:
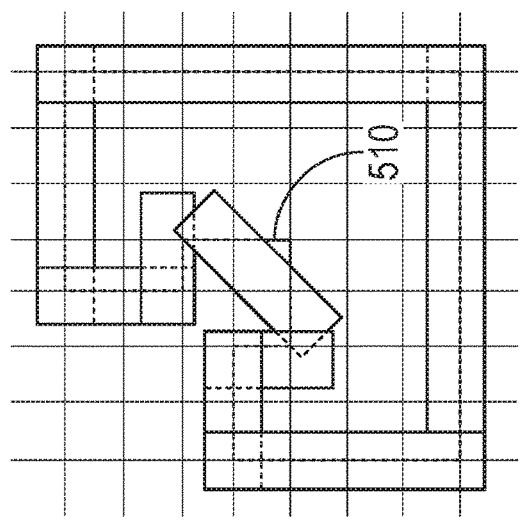

The grid 470 decomposes the contracted polygon 400B into a set of rectangular or squared grid cells. As illustrated in FIG. 4B, there are small parts of the environment that are not covered by the perimeter ranks or interior ranks. For example, grid cells of the interior environment (e.g., cell 471) are part of the polygon under the definitions of largest $E_C$ and smallest $E_C$. Some grid cells on or adjacent to the perimeter are part of the polygon only under only one but not the other definition (e.g., cell 472 being with the largest $E_C$ but not the smallest $E_C$). Some grid cells on or adjacent to the perimeter are not part of the contraction under either the largest $E_C$ or the smallest $E_C$ definition (e.g., cell 473). For those perimeter grid cells that are not part of the $E_C$, depending on the orientation of nearby interior ranks, they can be covered by either extending an existing rank, or adding one additional ranks. This coverage strategy for those area outside the $E_C$ based on the nearby interior ranks are illustrated in by way of example in FIGS. 5A-5C. In FIG. 5A, for some combinations of grids and polygons, the union of the contracted rectilinear polygon and the perimeter ranks may miss a small triangle 510. FIG. 5B illustrates that the interior ranks (e.g., ranks 512 and 514) covering the cells next to the missed triangle 510 are oriented in a compatible way (e.g., both 512 and 514 are horizontal ranks). Then, the adjacent interior ranks (e.g., rank 512) can be extended to cover the triangle 510. FIG. 5C illustrates that both of the interior ranks (e.g., ranks 513 and 514) adjacent to the missed triangle 510 are oriented in a different direction such as a substantially orthogonal direction (e.g., rank 513 is vertical and rank 514 is horizontal). Then, the missed triangle 510 can be covered by adding a new, short rank to cover it.

Referring back to FIG. 4C, the rectilinear contracted polygon $E_C$ 400C can be decomposed into groups of parallel ranks of a particular orientation (e.g., horizontal or vertical ranks) that cover a substantial portion of open area in the interior region 410. This process is also referred to as "rank partition" in this document. Depending on the shape of the environment, it may be more efficient to use multiple orientations of ranks. A rectilinear polygon can be decomposed into ranks parallel to either of its axes. Since most indoor environments are roughly rectilinear, they can be efficiently covered by these two directions. In an example, the rectilinear polygon can have integer side lengths, such that the partitioned regions of the environment have disjoint ranks.

Figure 4D:
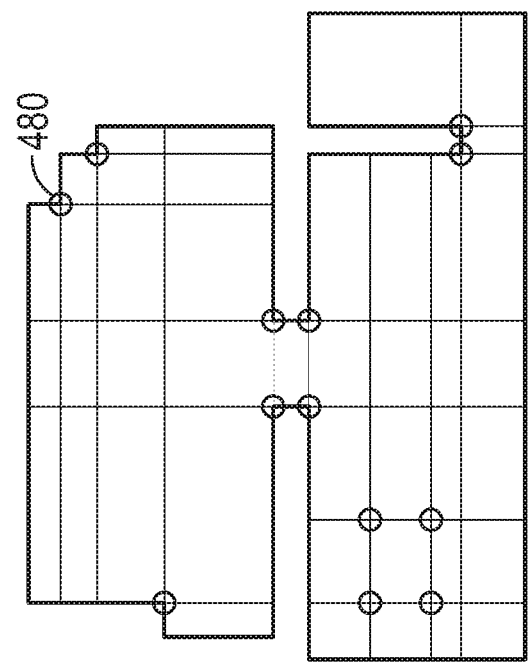
FIG. 4D is a diagram illustrating an example of checkerboard partition of the contracted polygon shown in FIG. 4C into regions.
Figure 4C:
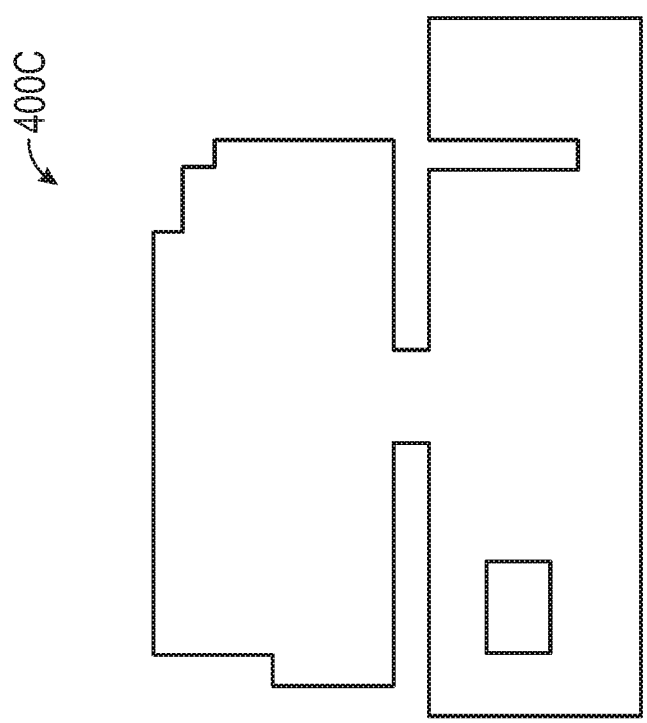

To facilitate rank partition of the rectilinear contracted polygon $E_C$ 400C, the $E_C$ 400C can be partitioned into disjoint regions P={r1, r2, . . . , rN}, as illustrated in FIG. 4D. For the rectilinear contracted polygon $E_C$, the partitioned disjoint regions are rectangles of different sizes. The number of rectangles (N) in the partition depends on the shape of the environment and not on the size of the environment or the robot. In some examples, the partition of $E_C$ 400 can result in two or more regions that overlap to each other, such as for duplicated traversal of at least a portion of a region (e.g., double cleaning of an area in the environment). In an example, the coverage planner of the controller 109 can partition the rectilinear contracted polygon $E_C$ 400C using a checkerboard partition approach. Various approaches of checkerboard partition of a rectilinear polygon have been considered by the present inventors. In one example, the rectilinear contracted polygon $E_C$ 400C can be partitioned into unit squares which results in a large number of rectangles (equal to the area of the rectilinear polygon). In another example, as illustrated in FIG. 4D, a coarse checkerboard partition can be obtained using only the edges incident to concave vertices of the polygon $E_C$ 400C (marked as circles, such as the concave vertex 480, in FIG. 4D). As the edges of the polygon's boundary are guaranteed to be edges of some rectangles in the checkerboard partition, each edge incident to concave vertices of the rectilinear polygon (e.g., edges 481 and 482 incident to the concave vertices 480) can be extended in a checkerboard partition, until intersecting with an orthogonal edge of the rectilinear polygon's boundary. The coarse checkerboard partition generally results in fewer rectangles and requires lower computational complexity.

Determine Orientations of Partitioned Regions

The partitioned rectangles, such as obtained through the checkerboard partition as discussed above with reference to FIG. 4D, can each be assigned ranks with a specific orientation, such as a horizontal or a vertical orientation. Determining the orientation of the ranks in a rectangle is also referred to as orienting a rectangle. The objective of orienting the partitioned rectangles is to assign orientations to minimize the total number of ranks while covering the entire robot environment. For a checkerboard partition with N rectangles, there are $2^N$ possible assignments, so it is not feasible to check them all. The present document describes a heuristic approach that creates a locally optimal assignment, such that the number of ranks from the assignment cannot be improved by changing the orientation of a single rectangle.

The orientation of a rectangle may be determined using dimension information of the rectangle, such as an aspect ratio of the rectangle. For a rectangle with integer width (w) and height (h), it can be decomposed into a set of unit-width horizontal ranks $\{R^h_1, \ldots, R^h_h\}$, or a set of unit-width vertical ranks $\{R^v_1, \ldots, R^v_w\}$, or some mixture of horizontal and vertical ranks. For an isolated rectangle, to minimize or reduce the number of ranks (and hence the number of turns the robot makes to traverse the environment), all the ranks in a rectangle can be parallel along a direction of the longest axis of the rectangle. For example, if w>h, then horizontal ranks (i.e., along the width of the rectangle) are created for the rectangle as that would result in fewer ranks than vertical ranks. If h>w, then vertical ranks (i.e., along the depth of the rectangle) are created for the rectangle as that would result in fewer ranks than horizontal ranks.

Figure 6C:
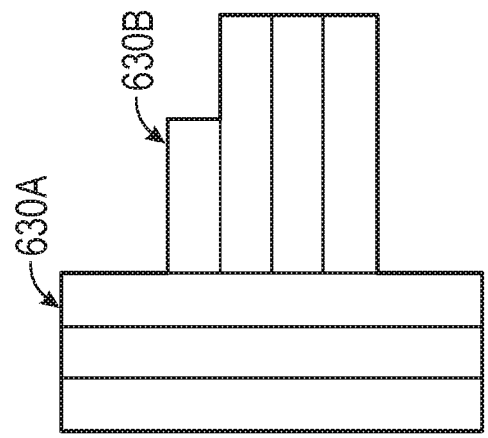
FIGS. 6A-6C are diagrams illustrating various strategies of rank orientation, division, and merger of partitioned regions based on region dimensions and properties of neighboring regions.
Figure 6B:
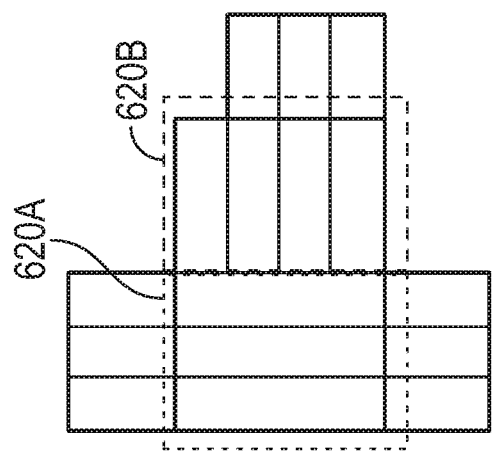
Figure 6A:
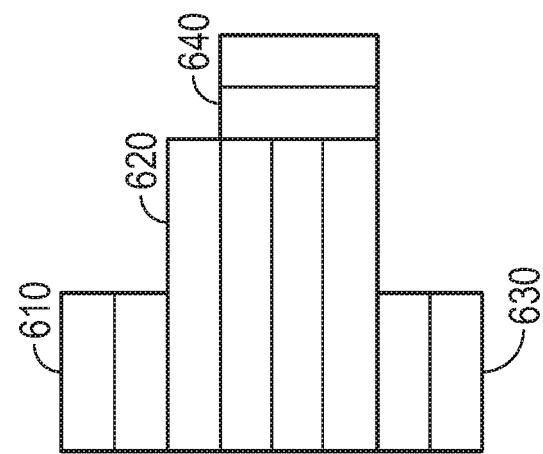

The orientation of a rectangle may additionally or alternatively be determined using properties of one or more neighbors (neighboring rectangles) of the rectangle. Depending on its neighbors' properties, the rank decomposition of a rectangle may be different from its rank decomposition in isolation (e.g., the ranks are oriented along the longest axis of the rectangle). In some examples, mixed ranks with different orientations such as substantially orthogonal (e.g., horizontal and vertical) orientations may be used. Referring now to FIGS. 6A-6C, which illustrates different rank orientation strategies applied to four disjoint rectangles 610, 620, 630, and 640 of a portion of a rectilinear polygonal map, such as obtained from the checkerboard partition. FIG. 6A illustrates locally optimal ranks determined using only the dimension information of each rectangles. When considered in isolation, the rank orientation for each rectangle is determined to be the direction of the longest axis of the rectangle. Therefore, rectangles 610, 620, and 630 all have horizontal ranks because w>h, and rectangle 640 takes vertical ranks because h>w. Accordingly, a total of ten ranks are created to cover the four rectilinear rectangles.

In FIG. 6B, properties of neighboring rectangles are taken into account when determining the rank orientation of a rectangle. If all of a rectangle's neighbors share an entire edge with the rectangle, that rectangle has a single orientation (e.g., either horizontal or vertical ranks but not mixed). If the rectangle's neighbors do not share the entire edge with the rectangle (which is the case in FIG. 6A), the rectangle can be decomposed into different sub-regions with different rank orientations. In FIG. 6B, the central rectangle 620 has two vertical neighbors 610 and 630, and one horizontal neighbor 640. Because the vertical neighbors 610 and 630 each have smaller widths (i.e., narrower) than the central rectangle 620, it is desirable to divide the rectangle 620 into a first sub-region 620A and a second sub-region 620B. The first sub-region 620A has vertical neighbors 610 and 630; therefore, it is determined that both the sub-region 620A and the vertical neighboring rectangles 610 and 630 all have vertical ranks. The second sub-region 620B has a horizontal neighbor rectangle 640); therefore, it is determined that both the sub-region 620B and the horizontal neighboring rectangle 640 have horizontal ranks. As such, a total of 16 ranks are needed to cover the rectilinear polygonal environment.

In FIG. 6C, the sub-regions 620A and 620B can each be merged with their respective neighboring rectangles, and so are the ranks within each of the regions being merged. For example, the sub-region 620A can be merged with rectangles 610 and 630, and the corresponding merged region 630A has only vertical ranks. The sub-region 620B can be merged with the rectangle 640, and the corresponding merged region 630B has only horizontal ranks. As a result, a total of seven ranks are needed to cover the entire rectilinear environment.

The determination of an orientation of the rectangle based on one or more of the rectangle's dimensions (e.g., an aspect ratio) or its neighbors' orientations are further illustrated in FIGS. 7A-7F. Diagrams in these figures illustrate six cases (combinations) where the orientation of a central rectangle 710 can be determined based at least on the orientations of neighboring rectangles, including up to two horizontal neighbors 720 and 730 and up to two vertical neighbors 740 and 750. A neighbor, if exists, can be either horizontally oriented (i.e., an "H" neighbor having horizontal ranks), or vertically oriented (i.e., a "V" neighbor having vertical ranks). A neighbor's orientation matters only if it is compatible for merging. A rectangle can merge with a horizontal neighbor if the horizontal neighbor's ranks are also horizontal. If the horizontal neighbor's ranks are vertical, the existence of this neighbor does not affect the rectangle under consideration's orientation. Therefore, in these cases one needs only consider horizontally oriented horizontal neighbors (i.e., horizontal neighbors with horizontal ranks, marked as "H"), or vertically oriented vertical neighbors (i.e., vertical neighbors with vertical ranks, marked as "V").

FIG. 7A illustrates a central rectangle 710 that has no compatible neighbors (either no neighbor exists, or the neighbor is oriented in a different direction than the central rectangle 710. The orientation of the central rectangle 710 can be determined based on its own dimensions (width vs. height), which can be either horizontally or vertically (denoted by "H/V") oriented. In an example, the central rectangle 710 can have an optimal orientation along with the longest edge of the rectangle 710 so as to minimize new ranks added.

FIG. 7B illustrates a central rectangle 710 that has one compatible horizontal neighbor 720 having a horizontal orientation (denoted by "H"). The orientation for the central rectangle 710 can be determined to be aligned with the neighbor 720, that is, the central rectangle 710 is also horizontally oriented such that no new ranks are added.

FIG. 7C illustrates a central rectangle 710 that has a horizontal neighbor 720 with an "H" orientation, and vertical neighbor 750 with a "V" orientation. In this case, both orientations, "H" or "V", may result in no change in the number of ranks. The orientation for the central rectangle 710 can be either H or V ("H/V"), depending on the dimensions of the central rectangle 710.

FIG. 7D illustrates a central rectangle 710 that has two compatible neighbors 720 and 730 along one direction (horizontal neighbors both having "H" orientations), and no compatible neighbors in the other direction (vertical direction in this example). The orientation for the central rectangle 710 can be aligned with the directions of both neighbors 720 and 730, that is, the central rectangle 710 is determined to be also horizontally oriented ("H"), as this would to reduce the total number of ranks.

FIG. 7E illustrates a central rectangle 710 that has three compatible neighbors 720, 730, and 750. The horizontal neighbors 720 and 730 are both horizontally oriented (i.e., having horizontal ranks, "H"), and the vertical neighbor 750 are vertically oriented (i.e., having vertical ranks, "V"). The orientation for the central rectangle 710 can be aligned with the direction of the two horizontal neighbors 720 and 730 rather than the single vertical neighbor 750, as this would reduce the total number of ranks.

FIG. 7F illustrates a central rectangle 710 that has two horizontal neighbors 720 and 730 that are horizontally oriented (i.e., having horizontal ranks, "H"), and two vertical neighbors 740 and 750 that are vertically oriented (i.e., having vertical ranks, "V"). For the central rectangle 710, both orientations, "H" or "V", may decrease the number of ranks. The orientation for the central rectangle 710 can be either H or V ("H/V"), depending on the dimensions of the central rectangle 710. In an example, the central rectangle 710 may take an orientation that causes the most ranks to be merged with either the vertical ranks of the vertical neighbors 740 and 750, or the horizontal ranks of the horizontal neighbors 720 and 730. For example, the orientation for the central rectangle 710 can be aligned with the shorter edge. For example, if w>h, then the central rectangle 710 takes vertical orientations and merges its ranks with those of the vertical neighbors 740 and 750. If w<h, then the central rectangle 710 takes horizontal orientation and merges its ranks with those of the horizontal neighbors 720 and 730. If both ranks have the same length, then either orientation is appropriate.

A locally optimal rank assignment is any assignment where every rectangle's orientation is locally optimal. The criteria for local optimality can also be used to convert any assignment into a locally optimal one by flipping the orientation of any rectangle whose orientation is not locally optimal (e.g., not obeying the orientation rules as set forth in FIGS. 7A-7F). Flipping the orientation causes a decrease in the number of ranks needed to cover the polygon. As the cost is bounded below by the cost of the globally optimal assignment, this procedure is guaranteed to terminate.

An exemplary algorithm 800 for orienting the rectangles is shown in FIG. 8. The algorithm 800 is represented by pseudo code that can be translated into instructions implemented in and executable by a microprocessor in a computing device, such as the controller 109. The algorithm 800 takes as input the partitioned regions P={r1, r2, ..., rN}, as illustrated in FIG. 4D, and produce as output the orientations for each region. The orientation represents a direction for the mobile robot to traverse the corresponding region, and can be either a first traversal direction, or a second traversal direction substantially orthogonal to the first traversal direction. In various examples, horizontal ("H") and vertical ("V") orientations on a two-dimensional environment map are considered in this document.

The algorithm 800 begins by assigning a random orientation ("H" or "V") to each partitioned rectangle (line 1). In each round of the algorithm (lines 6-17), a new rectangle ("r") is selected. The orientation for the selected rectangle can be determined based on its dimensions (height vs. width) and its neighbors' orientations, and according to the six diagrams shown in FIGS. 7A-7F, The orientation of the rectangle "r" can be stored in a set L (line 8). If horizontal and vertical orientations result in the same number of ranks, then both orientations ("H" and "V") are stored in the set L.

If the optimal orientation is different from the rectangle's current orientation (line 12), then the orientation of the rectangle, o(r), is flipped (line 13). Initially all rectangles are unchecked (line 4). As the rectangles are checked, the algorithm can keep track of which rectangles have been checked. If a rectangle's orientation is optimal (line 16), it is marked as checked (line 17). When a rectangle's neighbor's orientation changes (lines 10 and 13), its orientation may no longer be optimal; so its status is set back to unchecked (lines 11 and 14). When there are no more unchecked vertices, the main loop stops (line 6).

There is also an outer loop (lines 3-21) which changes a variable called the bias. The bias is used to decide the orientation of rectangles that have two locally optimal orientations (e.g., FIGS. 7A. 7C, and 7F). By setting all of these rectangles' orientations to the same value (the bias), one may enable another nearby rectangle to change to a better orientation. The bias is initially set to a random orientation (line 2). When a rectangle has two locally optimum orientations (e.g., FIGS. 7A. 7C, and 7F) and its current orientation is different from the bias (line 6), the orientation of the rectangle is flipped (line 10) and mark its neighbors as unchecked (line 11).

Once all vertices have been checked in the inner loop (lines 6-17), we check if the current set of orientations has improved (line 18). Improvements are defined as flips which decrease the cost of the assignment (where cost can be measured as the total number of ranks included in the rectangles of the polygon). If it has improved, we change the bias (line 19) and perform another round of the inner loop with the new bias. Before the inner loop, an improvement variable is set to its default value of false (line 5). This variable becomes true (line 15) if the number of ranks decreases, which can only happen when a rectangle is changed from a locally sub-optimal orientation to a locally optimal orientation (line 9). When the orientation changes from one locally optimal orientation to another locally optimal orientation (line 12), the number of ranks remains constant, so the improvement variable does not change. Once a round of the inner loop is performed without any improvement (line 20), the algorithm terminates. The orientations of the rectangles are returned as an output (line 21).

Depending on which bias happens to be used in the last round, the locally optimal set of orientations returned may be different. These two solutions have equal numbers of ranks. In some examples, another round of the inner loop (lines 6-17) may be performed with a different bias. The algorithm of FIG. 8 is guaranteed to reach a local optimal solution, but does not necessarily reach the global optimum every time. As each iteration of the inner loop can be performed in constant time, the algorithm runs very fast. It can be repeated multiple times with different initial random orientations to have a high chance of finding the global optimum.

Figure 4F:
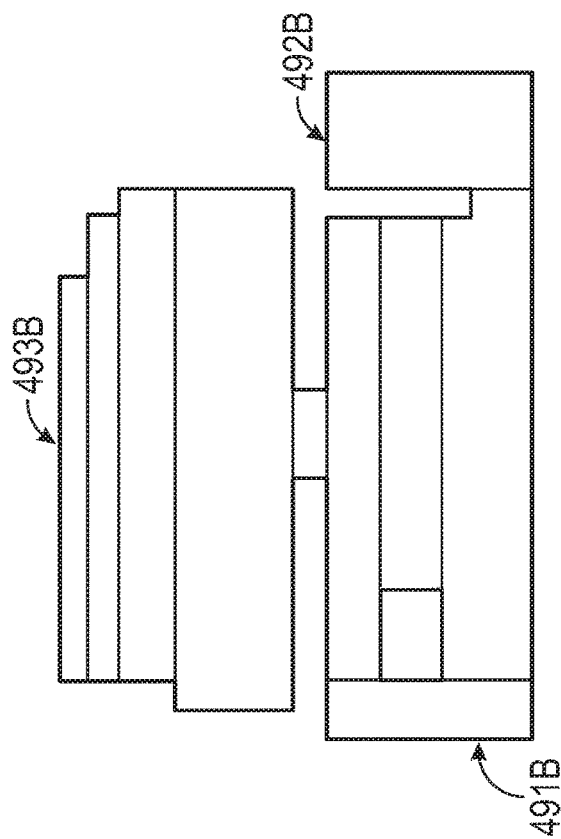
FIGS. 4E-4F are diagrams illustrating an example of merging the partitioned rectangles such as obtained from checkerboard partition.
Figure 4E:
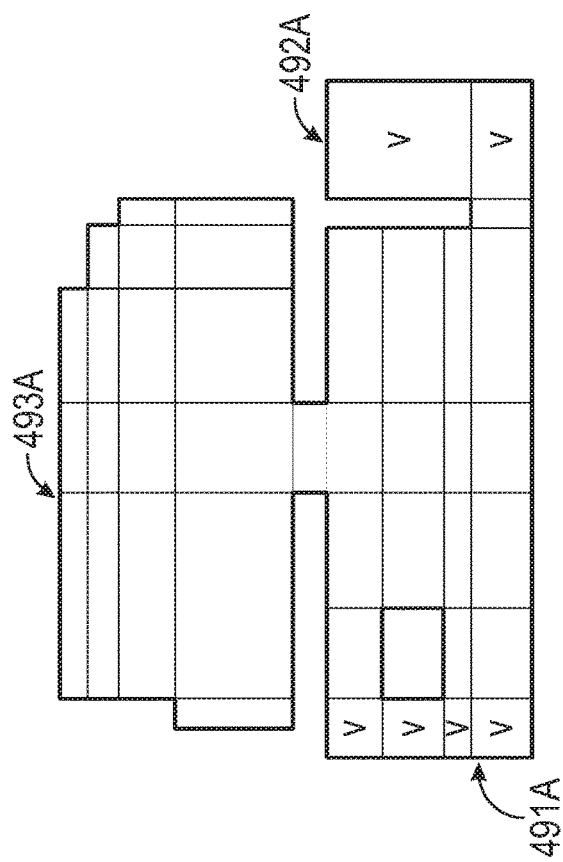

Referring back to FIGS. 4E-4G, which illustrate examples of rank partition for the rectilinear contracted polygon $E_C$ 400C. The rank partitions are performed on the rectangles produced by checkerboard partition, and include merging a set of neighboring rectangles each having their own locally optimal orientations. FIG. 4E illustrates locally optimal orientations for each of the rectangles resulted from the checkerboard partition, including a first set 491A of vertical neighbors all being vertically oriented, a second set 492A of vertical neighbors all being vertically oriented, and a third set 493A of horizontal neighbors all being horizontally oriented. FIG. 4F illustrates rectangles being merged based on the orientations of a set of neighboring rectangles. For example, consecutively horizontal neighbors that are horizontally oriented (locally optimal "H" orientation) can be merged into a wide rectangle. Similarly, consecutively vertical neighbors that are vertically oriented (locally optimal "V" orientation) are merged into a tall rectangle. By the process of merging, a small number of wide and tall rectangles can be created to partition the $E_C$. For example, the first set 491A of vertical neighbors are merged into one vertical rectangle 491B, the second set 492A of vertical neighbors are merged into one vertical rectangle 492B, and the third set 493A of horizontal neighbors are merged into a set of horizontal rectangles 493B.

Figure 4H:
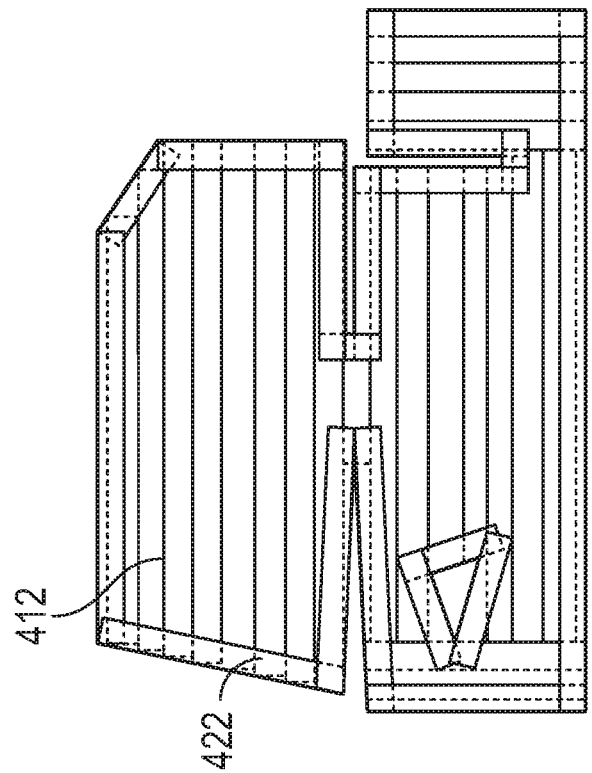
FIG. 4H is a diagram illustrating an example of the interior ranks and perimeter ranks created for the polygonal map shown in FIG. 4A.
Figure 4G:
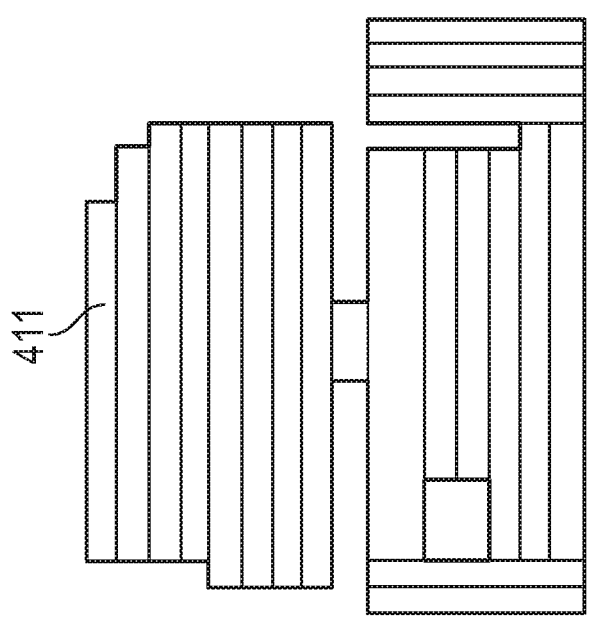
FIG. 4G is a diagram illustrating an example of decomposing the partitioned or merged rectangles each into a set of parallel interior ranks.

FIG. 4G illustrates the merged rectangles of FIG. 4F each being sliced along their axes (i.e., along the orientations of the rectangles being merged) into ranks 411, which are parallel unit-width rectangles. As discussed above, the contracted rectilinear polygon $E_C$ is constructed from, and represents an approximation of, the original robot environment E. The ranks that cover $E_C$ may not be the final complete set of ranks that can cover the original robot environment E. FIG. 4H illustrates a solution to rank partition of the robot environment E, which includes perimeter ranks 422 and the interior ranks 412. The perimeter ranks 422 cover the boundary of the robot environment E. The interior ranks 412 may be based on the rank partitions of $E_C$ (as illustrated in FIG. 4G), such as by extending the ranks 411 of $E_C$ to the boundary of E. In some examples, an additional short interior rank can be added to cover a small region which would be missed (e.g. FIG. 5A). By extending these ranks and possibly adding additional ranks, the combination of perimeter and interior ranks can cover the entirety of E, which can be reached given the robots shape and size.

Path Identification for One or More Robots

The coverage planner of the controller 109 can plan a path for a robot by assigning all or a portion of the ranks (such as determined by rank partition of the robot environment E as given in FIG. 4H) to the robot, and determining an order of covering the assigned ranks. In an example, the order can be determined by solving a variant of the travelling salesperson problem (TSP). The TSP is usually formulated as a graph. The graph includes a number of vertices representing cities and weights on edges between the cities that represent the travel time between cities. In the context of robot coverage, the graph's vertices represent coverage ranks, and the graph's edge weights represent the travel times between the ranks. However, the travel time between two ranks depends on which endpoints of the ranks the robot is ending and starting at. Since the difference between travel times is usually large when choosing either one or the other endpoint, one vertex is used for each of a rank's endpoints.

Figure 4J:
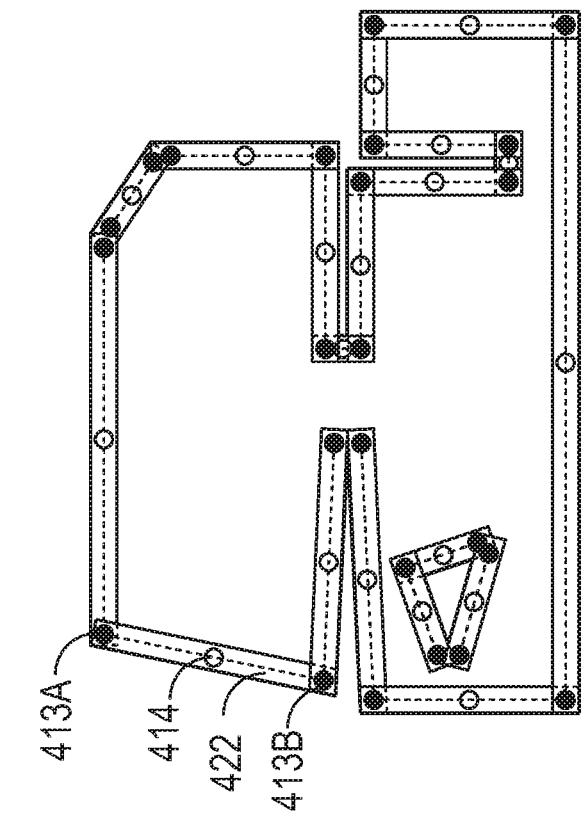
FIGS. 4I and 4J are diagrams illustrating path segments for the interior ranks and the perimeter ranks that are used by a travelling salesperson problem (TSP) solver to generate the coverage path.
Figure 4I:
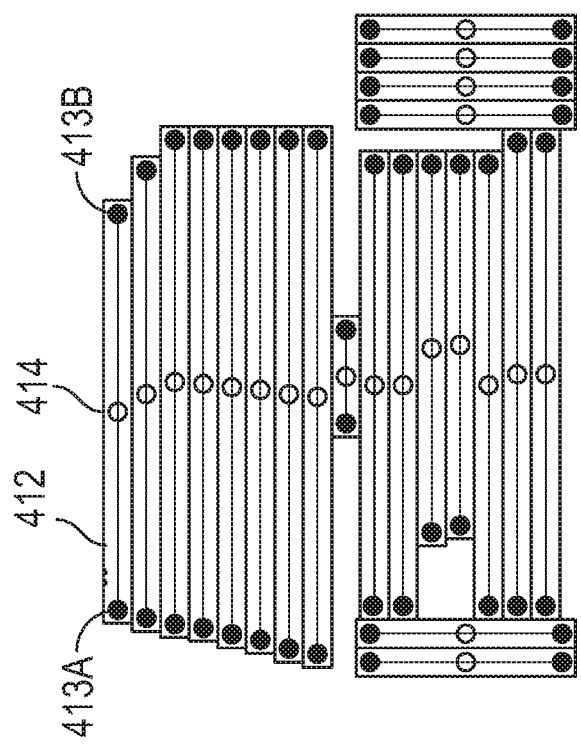

Solving the TSP on all rank endpoints does not guarantee a solution where both endpoints of a rank appear consecutively resulting in coverage of the rank. To force the robot to follow the ranks, a constraint is applied to the TSP problem such that endpoints of the same rank are always adjacent. This constraint is enforced by adding an additional midpoint vertex for each rank with infinite cost to any vertex other than its rank's endpoints. The addition of the midpoint vertex would force the rank's endpoints to be visited consecutively. The edge weights for edges between endpoints of different ranks represent the travel time from the end of one rank to the start of another. This method may be applied to both interior ranks and perimeter ranks. By way of example, FIG. 4I illustrates interior ranks 412, and FIG. 4J illustrates the perimeter ranks 422, for the robot environment 400A. Each of the interior ranks 412 and each of the perimeter ranks 422 can have corresponding endpoints (e.g., 413A and 413B) and a midpoint (e.g., 414) as the vertices in the graph used by the TSP solver to generate the coverage path. Lines connecting endpoints and midpoints, also referred to as path segments, represent the only edges incident to midpoints with finite weights.

Figure 4L:
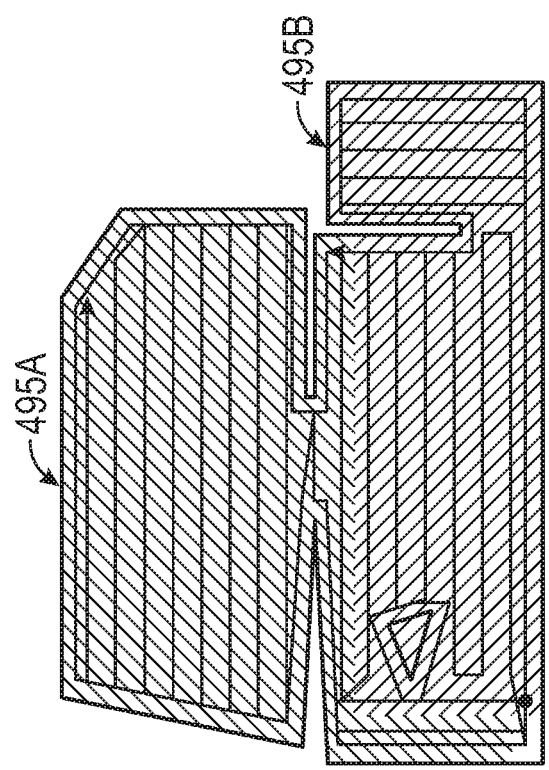
FIG. 4L is a diagram illustrating an example of time-minimizing paths, produced by a multiple travelling salespeople problem (m-TSP) solver, for two robots to jointly cover the entirety of the polygonal environment.
Figure 4K:
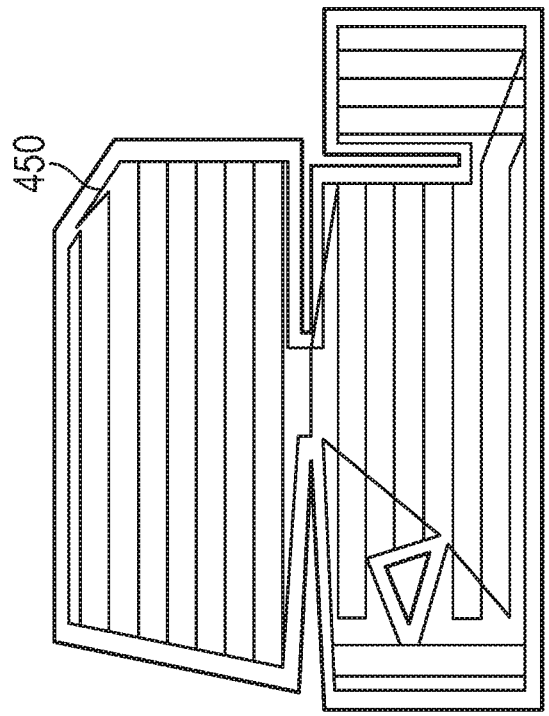
FIG. 4K is a diagram illustrating an example of a time-minimizing path, produced by the TSP solver, for a single robot to cover the entirety of the polygonal environment.

Solving the TSP on the complete weighted graph, which consists of all rank endpoints and midpoints and the travel times between them, gives a time-minimizing path on the graph for a single robot, such as a path 450 as illustrated in FIG. 4K. The time-minimizing path can also be a turn-minimizing coverage route. Examples of the TSP solver can include computing a visibility graph using the Welzl's algorithm or a variant thereof, which runs in quadratic time, and then computing the shortest paths between all pairs of vertices in cubic time using the Floyd-Warshall algorithm or a variant thereof. The infinite cost for all but two edges incident to each midpoint ensures that the three vertices of a rank are adjacent in the TSP solution. Therefore, in the TSP solution, the robot travels the full length of each length. Since the union of ranks cover the environment, the TSP solution provides complete coverage while minimizing or reducing the travel time. If the robot must start or end at a specific spot, endpoint constraints can be added to the TSP to get a near optimal coverage path starting and ending in the required locations.

Coverage of the environment may be performed by one robot or a team of two or more robots. In multi-robot coverage, the combined areas covered by several robots equals the required area. A multi-robot coverage strategy can be determined by solving a multiple-TSP (m-TSP) using the same graph as used by the TSP solver in a single robot coverage scenario. Therefore, the rank partition and generation of path segments of the robot environment E as illustrated in FIG. 4I can be used by the m-TSP solver. In an example, the multiple robots can have the same or similar configurations (e.g., a team of two or more vacuum robots with the same or similar width of working tools). In another example, multiple robots can have different configurations (e.g., a team of a vacuum robot and a mopping robot). The combined regions traced out by the team of robots completely or substantially cover the robots' environment.

There are several variants of the m-TSP with different cost functions. In an example, paths for each robot may be found by solving a minmax m-TSP, where the objective is to minimize the time taken by the slowest robot. In an example, the set of ranks can be first partitioned into one subset per robot while minimizing or reducing the expected coverage time for the robot with the largest expected coverage time. Each robot's path can be determined by solving the TSP on its set of ranks. The resulting paths are guaranteed to cover all accessible regions of the environment, have balanced lengths, and minimize or reduce the coverage time taken by the slowest robot.

FIG. 4L illustrates coverage paths for two robots, R1 and R2, determined by solving the minmax m-TSP on a graph constructed from the perimeter and interior rank polygons. R1 covers the sub-region 495A by travelling through the paths therein, and R2 covers the sub-region 495B by traveling through the paths therein. The combination of the paths in the sub-regions 495A and 495B cover the entire reachable interior and perimeter of the environment E, while minimizing the total coverage mission time. The m-TSP solution therefore provides a balanced workload between the robots, which minimizes or reduces the total mission time for coverage. The rank partition shown in FIG. 4H works well for the m-TSP as the size of individual coverage tasks are small enough that it is possible to balance the workload but large enough that the m-TSP solution can be computed in a reasonable amount of time.

The path created by the TSP solution can result in different types of distinctive behavior for the robot. It can follow closely around the perimeter of a wall or obstacle; move in consecutive long straight parallel ranks in the interior of the environment; move in consecutive long straight parallel ranks in a direction orthogonal to the direction of the first set of ranks; and travel in an efficient path from the end of one rank to the start of a different rank via critical points near convex corners. Using these distinct types of motion, the robot is able to minimize or reduce the number of turns it makes, hence minimize or reduce the total coverage time.

Figure 9A:
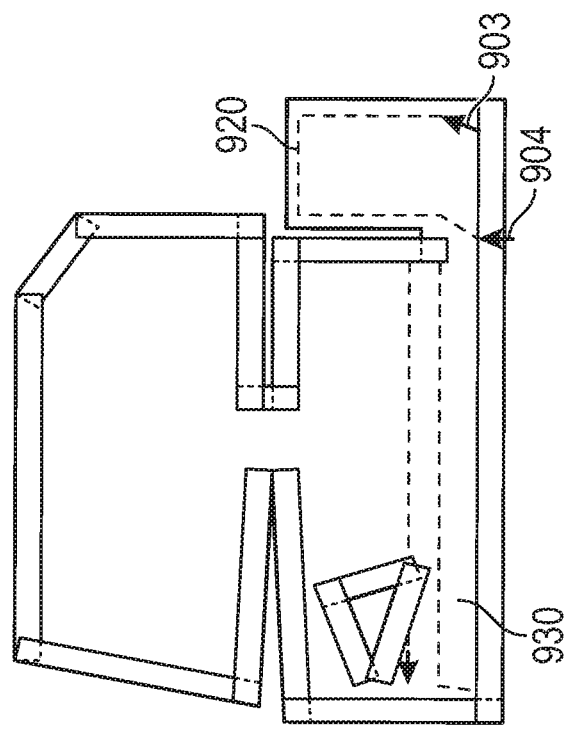
FIGS. 9A-9B are diagrams illustrating examples of an interleaving traversal pattern for a robot to cover different interior regions of the environment.
Figure 9B:
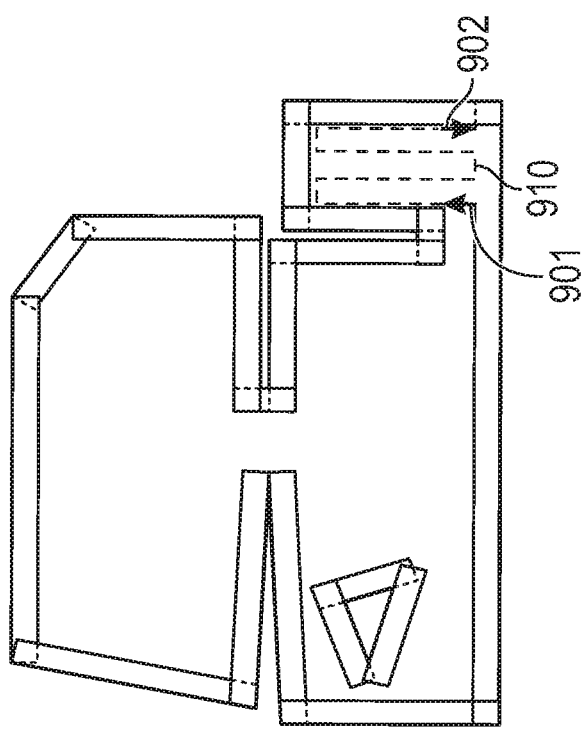

In various examples, the coverage planner of the controller 109 may schedule the coverage path for a robot whose assigned ranks include a portion of the interior ranks 412 and a portion of the perimeter ranks 422. For example, as illustrated in FIG. 4L, the robot R2 covers the sub-region 495B along the coverage path therein, which includes both perimeter ranks and interior ranks. The robot R2 may choose to traverse the perimeter ranks first and then the interior open area ranks, or to traverse the interior ranks first and then the perimeter ranks. In some examples, the robot may choose an interleaving traversal pattern between the perimeter ranks and the interior ranks. Under the interleaving traversal, the robot may use perimeter ranks to interconnect interior ranks of different interior regions. In some examples, the interior ranks of the first interior region may orient in a different direction than the interior ranks of the second interior region. As the perimeter ranks and interior ranks are associated with respective path segments (as shown in FIG. 4I), the resulting path for the robot may include perimeter path segments interconnecting the path segments associated with the interior ranks of different interior regions of the environment. FIGS. 9A-9B illustrate by way of example and not limitation an interleaving traversal pattern. Sub-region 495B comprises a first interior open area 910, a second interior open area 930, and perimeter 920. The robot R2 may use the perimeter ranks along the perimeter 920 as a connection path between the two open areas 910 and 920. As illustrated in FIG. 9A, the robot R2 first covers the first open area 910, starting from location 901, following the interior ranks therein, until it reaches location 902. FIG. 9B illustrates that, after a complete coverage of the first open area 910, the robot R2 can rotate and begin traversing the perimeter ranks 920 from location 903. Upon a complete coverage of the perimeter ranks 920, the robot R2 enters an entry location 904 of the second interior area 920, and traverse said area following the interior ranks therein. The interleaving traversal pattern discussed herein may also be applied to other robots, such as R1, to traverse different open areas and the perimeter of the assigned region, such as the sub-region 495A. In some examples, the interleaving traversal pattern may be extended to other types of ranks, or new ranks created, for a team of cooperative robots, such as dry ranks for a vacuum robot and wet ranks for a mopping robot.

Restrictive Path Based on User Instructions

Figure 10A:
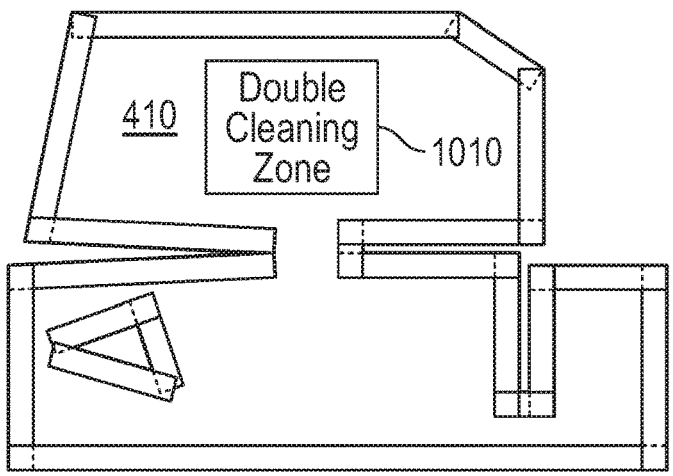
FIGS. 10A-10C are diagrams illustrating a coverage path in an environment having a user-defined duplicate cleaning zone.
Figure 10B:
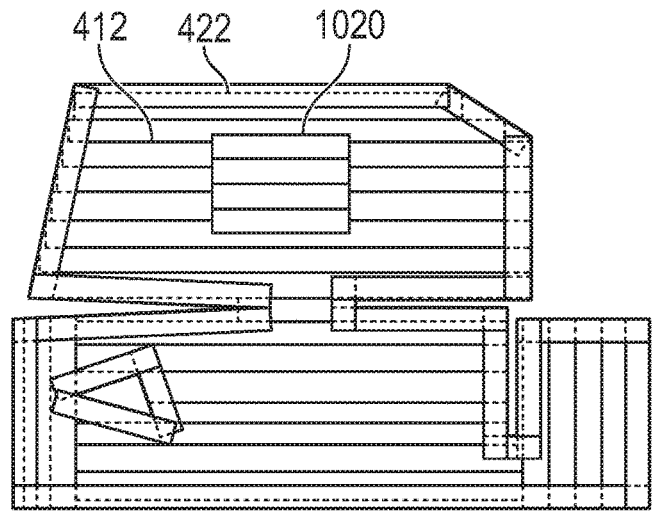
Figure 10C:
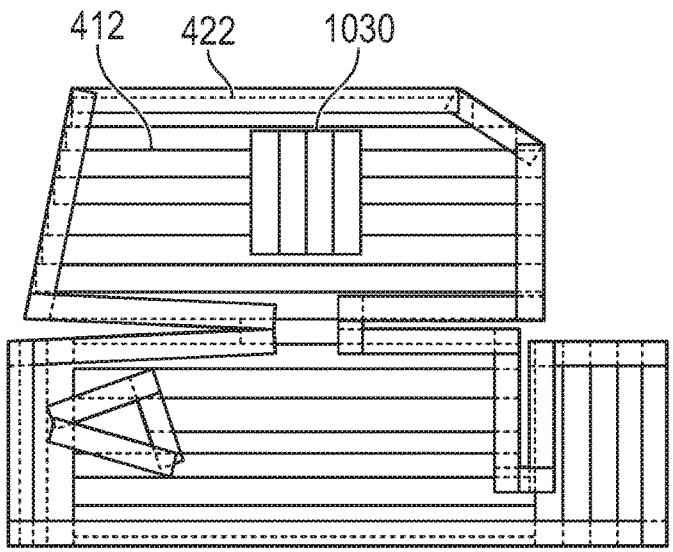

As discussed above, the rank partition and path planning may be based on environment information, such as an environment map captured by a camera, stored in the memory 144, and used by the controller 109 for coverage planning. In various examples, through a user interface of a remote device, such as the remote device 188 communicatively coupled to the robot 100, a user may update the base environment map, such as by turning on or off certain restrictions on robot access (e.g., keep-out or dangerous zones), specifying or changing a robot transversal direction or a traversal pattern (e.g., interleaving between different types of ranks during traversing the environment), or adding or removing certain types of specialized cleaning ranks (e.g., dry ranks for cleaning robot, wet ranks for mopping), among others. The rank partition and path planning generated from said modified environment map are hereinafter referred to as restrictive rank partition and restrictive paths. FIGS. 10-12 illustrate, by way of example and not limitation, various modification of the environment map (such as the map of the environment 440A), or user instructions or restrictions on rank partition and path planning, and the corresponding restrictive rank partition and restrictive paths. FIG. 10A illustrates a user-defined duplicate cleaning zone 1010 within the interior region 410. The duplicate-cleaning zone 1010 requires cleaning more than once. FIGS. 10B-10C illustrates restrictive ranks created by adding additional ranks to the ranks generated from the base environment map (e.g., the interior ranks 412 and the perimeter ranks 422). Restrictive paths may be created by connecting the restrictive ranks, thus allowing the robot to revisit the duplicate cleaning zone along the additional ranks. In an example, the traversal of the additional ranks 1020 can be performed by interleaving with other ranks (e.g., interior ranks outside the duplicate cleaning zone, or the perimeter ranks). In an example, the traversal of the additional ranks 1020 can be performed in a non-interleaving manner, such that the duplicate traversal is completed without traversing other ranks outside the duplicate cleaning zone. The orientation of the additional ranks may be dependent on the dimensions of the duplicate-cleaning zone 1010 (e.g., aspect ratio of a rectangular duplication-cleaning zone). FIG. 10B illustrates an example of additional ranks 1020 (for the revisit) that have the same orientation (e.g., horizontal) as the first traversal of the duplicate-cleaning zone 1110. FIG. 10C illustrates an example of the additional ranks 1030 (for the revisit) that have a different orientation (e.g., vertical) than the ranks associated with the first traversal of the duplicate-cleaning zone 1110.

Figure 11A:
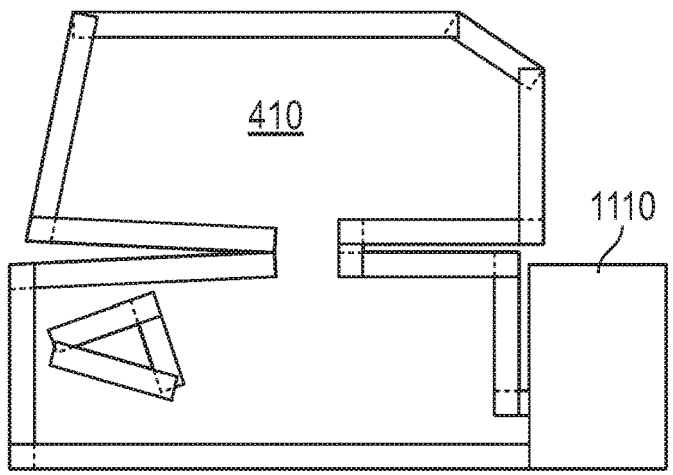
FIGS. 11A-11C are diagrams illustrating a coverage path in an environment having a user-specified keep-out or hazard zone.
Figure 11B:
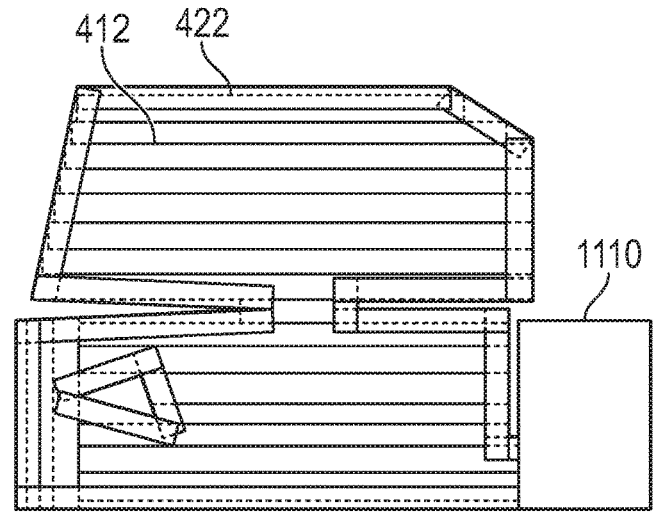
Figure 11C:
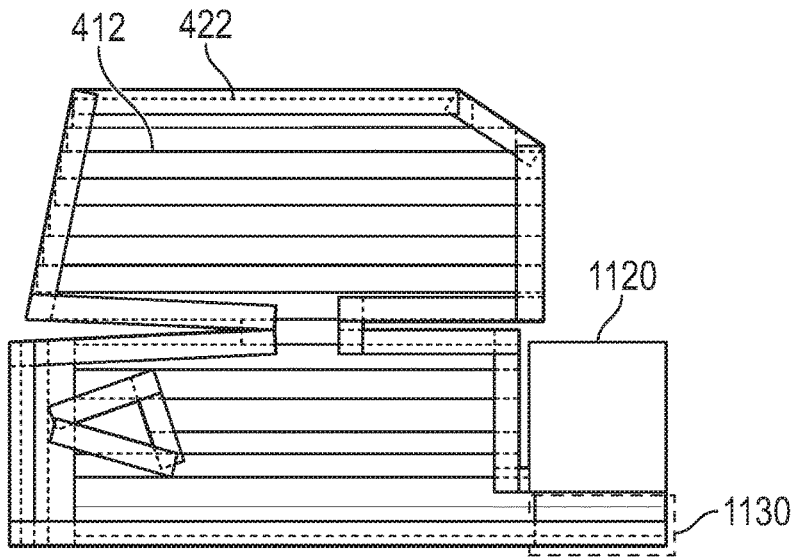

FIG. 11A illustrates a user-defined keep-out or hazard zone 1110 within the interior region 410. FIG. 11B illustrates the restrictive ranks, such as created by removing the ranks within the interior region 410 from the set of ranks generated from the base environment map. In some examples as illustrated in FIG. 11B, perimeter ranks along the boundary of the keep-out or hazard zone 1110 may also be removed. Restrictive paths may be created by re-connecting the restrictive ranks, such that one interior rank is connected to its neighboring rank without entering the keep-out or hazard zone 1110. In some examples, in response to an addition, removal, or otherwise a modification of a user-defined keep-out or hazard zone, one or more of the operations such as partitioning the environment, determination of orientations of one or more partitioned regions, merging of partitioned regions, or rank assignment to one or more partitioned regions may be updated according to the modified map, and at least a portion of the path may be regenerated or modified. FIG. 11C illustrates an example where in response to an addition of a keep-out or hazard zone 1120, the coverage planner of the controller 109 may reevaluate at least regions neighboring the keep-out or hazard zone 1120, such as region 1130, and assign a new rank orientation based on the dimensions (e.g., an aspect ratio) of the region 1130. In this example, the new rank orientation (horizontal) of the region 1130 is different from its old rank orientation (vertical, as shown in FIG. 4H). The region 1130 can further be merged with its neighboring region of the environment which has the same (horizontal) rank orientation.

Figure 12B:
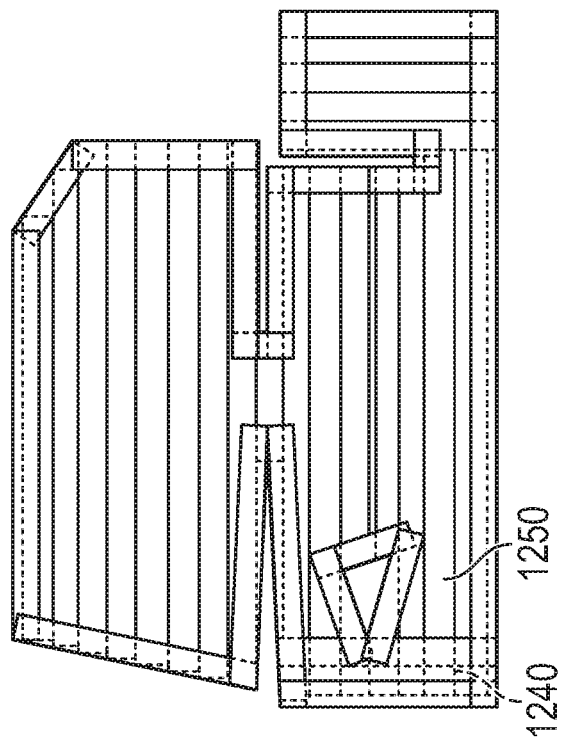
FIGS. 12A-12B are diagrams illustrating a coverage path created or updated in accordance with a user-defined robot traversal direction or pattern.
Figure 12A:
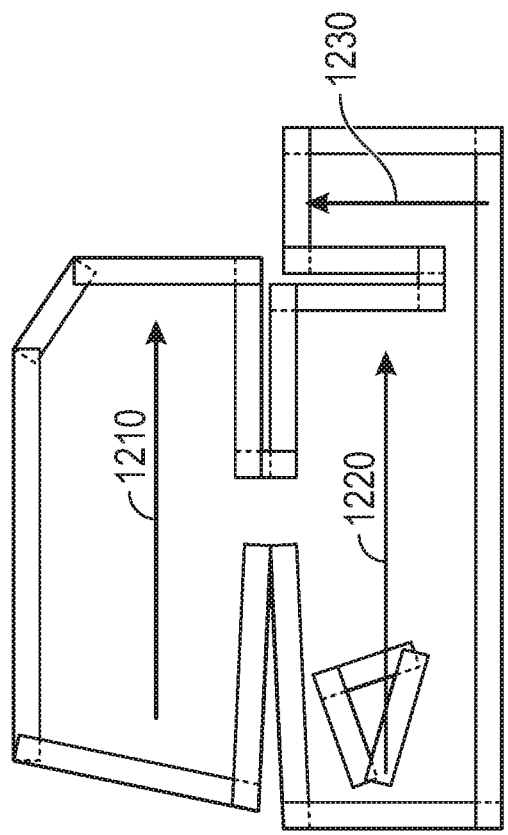

FIG. 12A illustrates a user-defined robot traversal pattern, such as orientations and/or directions of robot motion in one or more sub-regions of the environment. As illustrated in FIG. 12A, a user defines a horizontal direction 1210 for a first sub-region, a horizontal direction 1220 for a second sub-region, and a vertical direction 1230 for a third sub-region. FIG. 12B illustrates the restrictive ranks in accordance with the user-defined directions. The restrictive ranks can be created by modifying or overriding the set of ranks generated from the base environment map. For example, in accordance with the horizontal direction 1220, the set of vertical ranks in the vertical rectangle 491B are replaced by a set of horizontal ranks 1240 in the same area, which can be merged with horizontal interior ranks 1250 in the interior sub-region generated from the base environment map.

Figure 13:
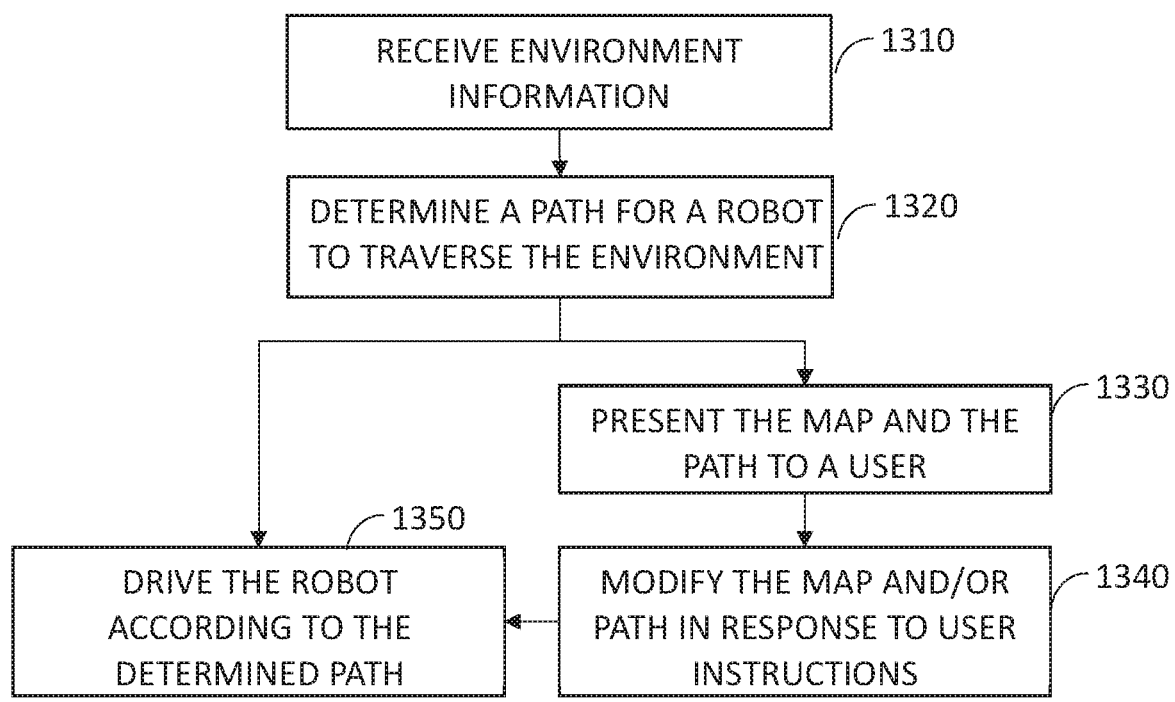
FIG. 13 is a flowchart illustrating an example of a method of operating a mobile robot in an environment in accordance with a coverage path.

FIG. 13 is a flowchart illustrating an example of a method 1300 for operating a mobile robot, such as the robot 100, in an environment in accordance with a coverage path. The robot can accomplish a designated mission, such as cleaning a surface area (e.g., vacuuming or mopping the floor), mowing lawns, or performing surveillance, as it traverses along an identified path in the environment. The method 1300 may be implemented in and executed by the mobile robot, a remote device or a mobile device in communication with the mobile device system. In an example, at least portions of the method 1300 may be implemented in and executed by the controller 109 of the robot 100.

The method 1300 commences at 1310, where information of an environment for a robot to traverse is received. The environment information can include environment map generated from, for example, images captured by a camera. The camera can be integrated into the mobile robot, or separated from the mobile robot. The map can indicate locations of traversable and nontraversable space within the environment. In an example, the map is a persistent map that is usable and updateable, such as by the controller 109 of the robot 100. An example of the environment map is the map of a polygonal map 400A shown in FIG. 4A. Such a polygonal map is an approximation of a floor surface of the robot environment. The environment map includes graphical representations of interior region, boundaries, and one or more negative areas representing, for example, obstacle, a keep-out zone, or a dangerous area as specified by a user.

At 1320, a path for the mobile robot to traverse the environment (or a portion thereof) can be determined using the received environment information, such as the environment map. The path planning may be carried out by using the coverage planner of the controller 109. The path includes a set of linear path segments connected by a number of turns therebetween. A turn refers to a robot motion between two long straight segments of a robot's path, which usually are by an angle of 180 degrees but may be other angles. The process of determining a path for the mobile robot may include various steps of environment partitioning, rank assignment to the partitioned regions, and path planning, as illustrated in FIGS. 4-9. Examples of identifying a path for a robot using the environment map are discussed below, such as with reference to FIG. 14.

At 1330, the environment map and the robot path may also be displayed on a user interface of a mobile device, such as the mobile device 188. Operationally, at 1340, a user instruction may be received via the user interface to modify the environment map, such as illustrated in FIG. 11A, 12A, or 13A. A user may add, remove, or otherwise modify a keep-out traversable zone in the environment; add, remove, or otherwise modify a duplicate traversal zone in the environment (such as an area that requires repeated cleaning); restrict a robot traversal direction or traversal pattern in a portion of the environment; or add or change a cleaning rank, among others, as illustrated in FIG. 11B, 12B, or 13B.

At 1350, the mobile robot may be driven to traverse the environment, such as by a drive system of the mobile robot, in accordance with the determined path. The mobile robot may perform its designated mission (e.g., cleaning, mowing, etc.) as it traverses the environment. If the environment has been updated or the traversal path has been modified by the user at 1340, the mobile robot may be driven to traverse the environment according to the modified path, either specified by the user or regenerated based on the updated environment map.

Figure 14:
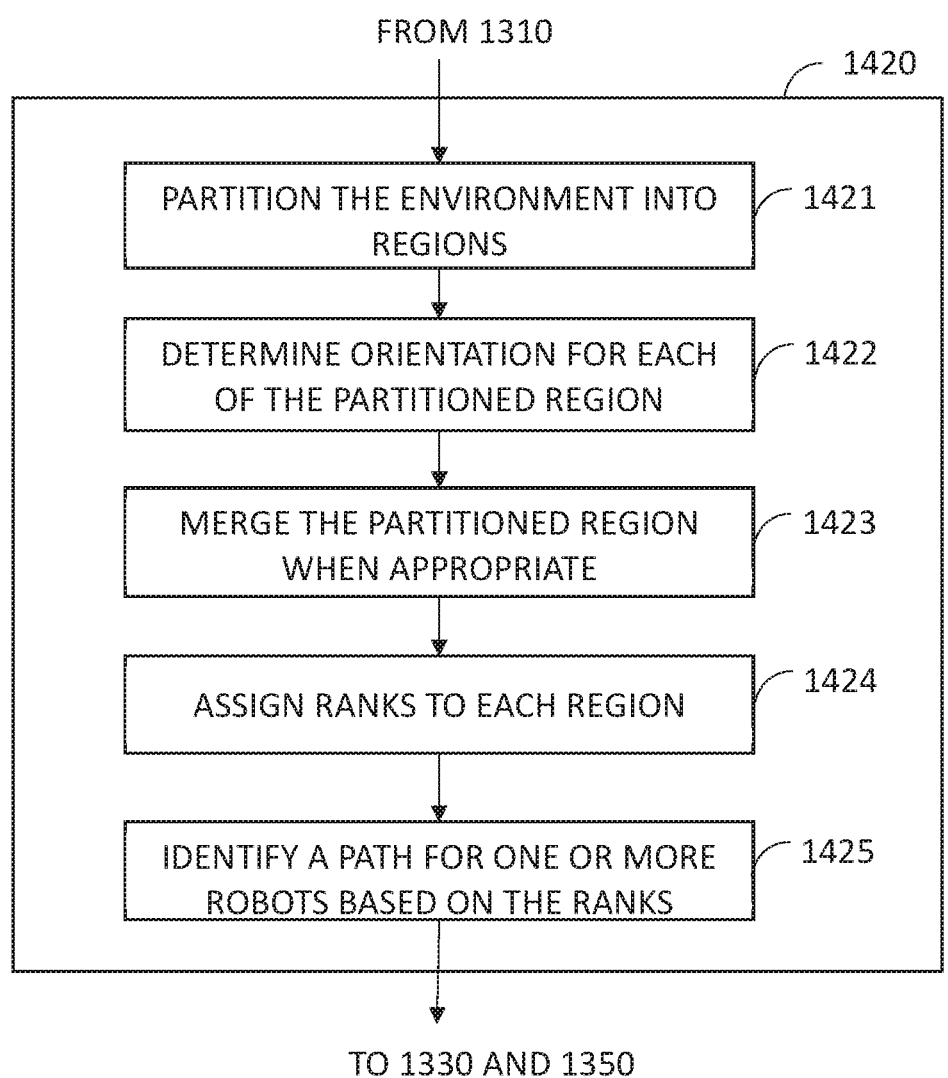
FIG. 14 is a flowchart illustrating an example of a method for identifying a path for the robot to traverse the environment or a portion thereof.

FIG. 14 is a flowchart illustrating an example of a method 1420 for identifying a path for the robot to traverse the environment. The method 1430 is an embodiment of a portion of the method 1300, such as the step 1320. The method 1420 comprises steps of environment partitioning, rank assignment to the partitioned regions, and path planning, examples of which are illustrated in FIGS. 4-9.

At 1421, the robot environment, such as illustrated in the polygonal map 400A, may be partitioned into multiple regions. To facilitate partitioning, a rectilinear contracted polygon $E_C$ can be created based on the polygonal map using a discretized grid 470, as illustrated in FIGS. 4B and 4C. The rectilinear contracted polygon $E_C$ is an approximation of the robot environment E, and covers substantial interior of the robot environment E. The rectilinear contracted polygon $E_C$ can be partitioned into disjoint rectangles of various sizes, such as by using a checkerboard partition approach where only the edges incident to concave vertices of the rectilinear contracted polygon are extended until intersecting with an orthogonal edge of the rectilinear polygon's boundary, as illustrated in FIG. 4D. In some examples, the partition of the polygonal map 400A can result in two or more regions that overlap to each other, such as for duplicated traversal of at least a portion of a region (e.g., double cleaning of an area in the environment).

At 1422, orientations can be determined for the partitioned regions, such as the disjoint rectangles shown in FIG. 4D. A heuristic approach can be used to determine a locally optimal orientation for each partitioned region. The orientation of a rectangle may be determined using dimension information of the rectangle, such as an aspect ratio of the rectangle. For example, the orientation of a rectangle can be determined to be the direction of the longest axis of the rectangle. Additionally or alternatively, properties of one or more neighbors (neighboring rectangles) may be taken into account in determining the locally optimal orientation of a partitioned region. For example, the orientation of a central rectangle can be determined based on the number of neighboring rectangles, their locations relative to the central rectangle, and the orientations of the neighboring rectangles, as illustrated in FIG. 7A-7F. In various examples, a rectangle can be decomposed into different sub-regions with different orientations depending on the properties of neighboring rectangles, as illustrated in FIGS. 6B-6C. An algorithm of orienting the rectangles, represented by pseudo-code, is given in FIG. 8.

At 1423, some neighboring rectangles, each having their own locally optimal orientations, can be merged into one rectangle based on the orientations of the neighboring rectangles. For example, consecutively horizontal neighbors that are horizontally oriented can be merged into one wide rectangle. Similarly, consecutively vertical neighbors that are vertically oriented can be merged into one tall rectangle. Examples of merging the rectangles are discussed with reference to FIGS. 4E and 4F.

At 1424, ranks are created for each partitioned region or the merged region. The ranks are parallel unit-width rectangles, as illustrated in FIG. 4G. The unit width can be equal to the width of the robot's tool (e.g., sweeping, mopping, or mowing tools). The robot can cover a single rank with a linear motion, and make a turn when it transits from one rank to another. For a partitioned region, the ranks therein are oriented in the same direction as the orientation of the partitioned region determined at step 1422. Such a rank assignment based on the orientation of the partitioned region can result in least number of ranks, such that the resulting path has reduced number of turns.

The contracted rectilinear polygon $E_C$ is constructed from, and represents an approximation of, the original robot environment E. The ranks that cover $E_C$ may be extended to the boundary of the original robot environment E to cover the robot environment E. Additionally, separate perimeter ranks may be applied to cover the perimeter of the original robot environment E. An example of the complete ranks, including the internal ranks and perimeter ranks, is shown in FIG. 4H.

At 1425, a path may be created for one or more robots using the ranks created for each partitioned or merged region. The path can be created by connecting the ranks in an order such that the ranks are covered with least number of turns. In an example, the order of the ranks can be determined by solving a variant of the travelling salesperson problem (TSP). In some examples, a constraint is applied to the TSP problem such that endpoints of the same rank are always adjacent. This constraint is enforced by adding an additional midpoint vertex for each of the interior ranks and each of the perimeter ranks (as shown in FIGS. 4I and 4J) with infinite cost to any vertex other than its rank's endpoints. The addition of the midpoint vertex would force the rank's endpoints to be visited consecutively. An example of the path for a robot to cover the entirety of the environment is illustrated in FIG. 4K.

In some examples, at 1425, respective paths may be created for each of a team of two or more robots that work together to cover the environment. A multi-robot coverage strategy can be determined by solving a multiple-TSP (m-TSP) using the ranks created at 1424 for the environment. The multiple robots can have the same or similar configurations (e.g., a team of two or more vacuum robots with the same or similar width of working tools). Alternatively, the multiple robots can have different configurations or assignments (e.g., a vacuum robot and a mopping robot). Paths for the multiple robots may be determined by solving a minmax m-TSP, where the objective is to minimize the time taken by the slowest robot. In an example, the set of ranks can be first partitioned into one subset per robot while minimizing or reducing the expected coverage time for the robot with the largest expected coverage time. Each robot's path can be determined by solving the TSP on its set of ranks. FIG. 4L illustrates an example of two robots R1 and R2 jointly covering the polygonal environment according to their respective paths determined by solving the minmax m-TSP, which minimizes or reduces the total mission time for coverage.

Figure 15:
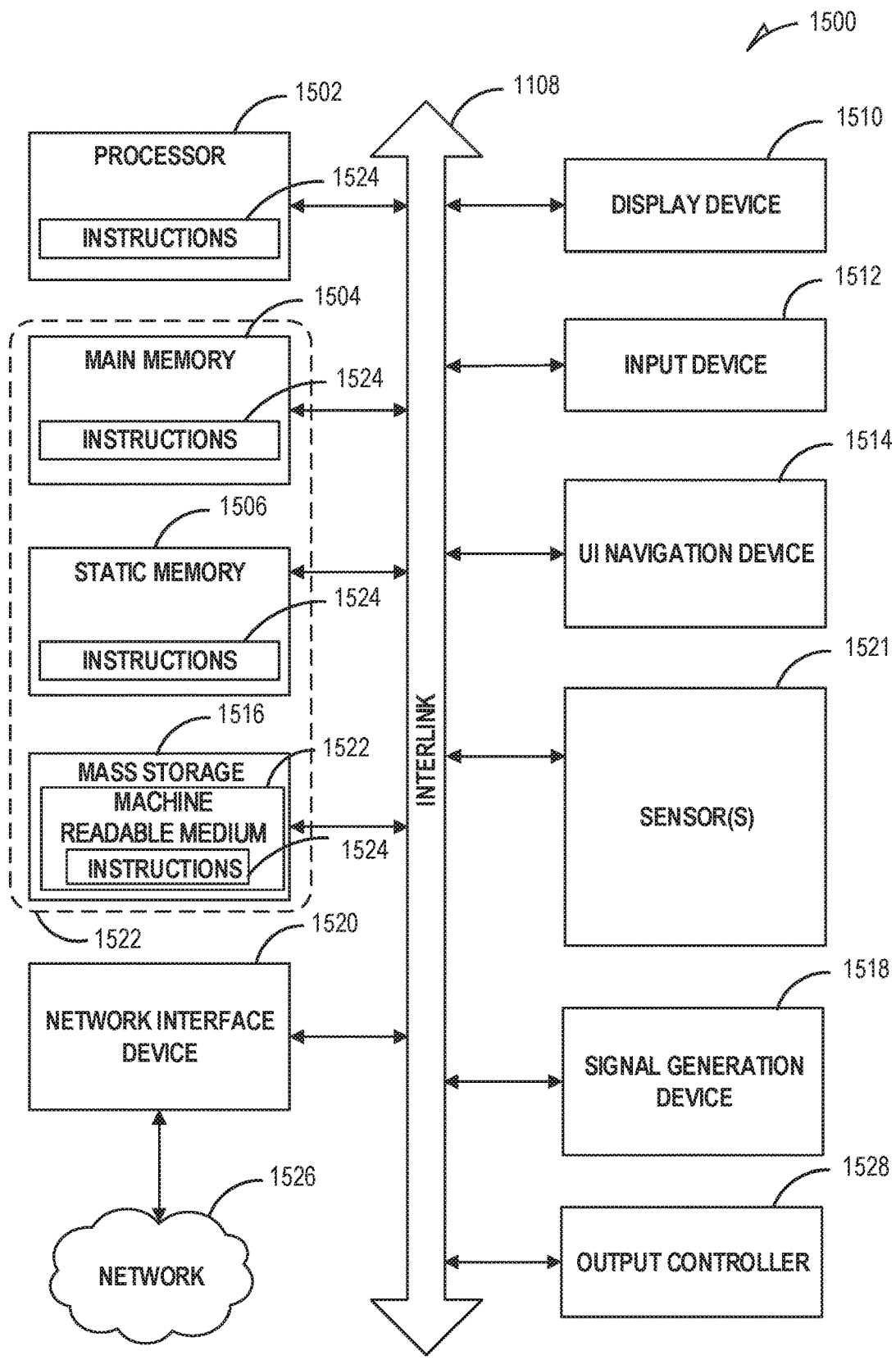
FIG. 15 is a block diagram illustrating an example machine upon which any one or more of the techniques (e.g., methodologies) discussed herein may perform.

FIG. 15 illustrates generally a block diagram of an example machine 1500 upon which any one or more of the techniques (e.g., methodologies) discussed herein may perform. Portions of this description may apply to the computing framework of various portions of the mobile robot 100, the mobile device 188, or other computing system such as a local computer system or the cloud computing system 192.

In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a display unit 1510 (e.g., a raster display, vector display, holographic display, etc.), an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine readable media.

While the machine-readable medium 1522 is illustrated as a single medium, the term "machine readable medium" may include a single medium or multiple media (e.g., a centralized or distributed database, and/or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1524 may further be transmitted or received over a communication network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 1520 may include one or more physical jacks (e.g., Ethernet, coaxial, or phone jacks) or one or more antennas to connect to the communication network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A system comprising:
   at least one controller configured to:
   receive information of an environment;
   determine an orientation of a region in a portion of the environment based at least on a dimension of the region;
   determine a path for a mobile robot to traverse the portion of the environment using the determined orientation of the region; and
   generate a control signal to the mobile robot to move the mobile robot along the determined path in the environment;
   wherein the path includes a set of linear path segments connected by a number of turns therebetween, and the determination of the path reduces the number of turns in the path compared with a path having at least one portion in a substantially orthogonal direction,
   wherein the received environment information includes an environment map, and the at least one controller is further configured to:
   partition the environment map into regions;
   determine, for each of a number of the partitioned regions, a corresponding orientation based at least on (1) a location of at least one neighboring region relative to the partitioned region, and (2) dimensional information of the at least one neighboring region, the orientation representing a direction for the mobile robot to traverse the corresponding region; and
   determine the path for the mobile robot using the orientations of the number of the partitioned regions.

2. The system of claim 1, wherein the orientation associated with a partitioned region includes a first traversal direction, or a second traversal direction substantially orthogonal to the first traversal direction on the environment map.

3. The system of claim 1, wherein the at least one controller is configured to:
   decompose each of the number of the partitioned regions into a set of parallel interior ranks each having a width substantially equal to a width of the mobile robot, the parallel interior ranks oriented in alignment with the orientation of the corresponding partitioned region; and
   determine the path for the mobile robot using the parallel interior ranks of the number of the partitioned regions.

4. The system of claim 3, wherein the at least one controller is further configured to:
   generate one or more perimeter ranks along a boundary of the environment; and
   determine the path for the mobile robot further using the one or more perimeter ranks.

5. The system of claim 4, wherein at least one of the one or more perimeter ranks interconnects (1) a first set of interior ranks in a first partitioned region and (2) a second set of interior ranks in a second partitioned region.

6. The system of claim 5, wherein the first set of interior ranks orient in a different direction than the second set of interior ranks.

7. The system of claim 1, comprising the mobile robot that includes:
a drive system configured to drive the mobile robot to move along the determined path in the environment; and
a cleaning system configured to clean the environment as the mobile robot moves along the determined path.

8. The system of claim 1, comprising a remote device separate from and configured to communicate with the mobile robot, the remote device including a user interface configured to display a map of the environment and the determined path on the map.

9. The system of claim 8, wherein the remote device includes at least one of a local computer server, a cloud server, or a mobile phone.

10. The system of claim 8, wherein the user interface is configured to receive a user instruction to modify the environment map; and
wherein the remote device includes at least one of the at least one controller that is configured to modify the determined path using the modified environment map.

11. The system of claim 10, wherein the user instruction includes adding a keep-out traversable zone in the environment, and the at least one of the at least one controller is configured to remove a portion of the determined path corresponding to the keep-out zone.

12. The system of claim 10, wherein the user instruction includes adding a duplicate traversal zone in the environment, and the at least one of the at least one controller is configured to:
determine, for the duplicate traversal zone, a set of parallel interior ranks oriented in a direction based at least on dimensional information of the duplicate traversal zone; and
add to the determined path an additional path corresponding to the interior ranks for the duplicate traversal zone.

13. The system of claim 10, wherein the user instruction includes a user-specified robot traversal direction or pattern, and the at least one of the at least one controller is configured to modify the determined path using the user-specified robot traversal direction or pattern.

14. A mobile robot, comprising:
a drive system;
a memory configured to store a map of an environment; and
a controller configured to determine an orientation of a region in a portion of the environment based at least on a dimension of the region, and to determine a path for a mobile robot to traverse the portion of the environment using the determined orientation of the region, the path including a set of linear path segments connected by a number of turns therebetween, and the determination of the path reduces the number of turns in the path;
wherein the drive system is configured to drive the mobile robot to move in the environment according to the determined path,
wherein the controller is further configured to:
partition the environment map into regions;
determine, for each of a number of the partitioned regions, a corresponding orientation based at least on (1) a location of at least one neighboring region relative to the partitioned region, and (2) dimensional information of the at least one neighboring region, the orientation representing a direction for the mobile robot to traverse the corresponding region; and
determine the path for the mobile robot using the orientations of the number of the partitioned regions.

15. The mobile robot of claim 14, further comprising a cleaning system configured to clean the portion of the environment as the mobile robot moves along the determined path.

16. The mobile robot of claim 14, wherein the controller is configured to:
decompose each of the number of the partitioned regions into a set of parallel interior ranks each having a width substantially equal to a width of the mobile robot, the parallel interior ranks oriented in alignment with the orientation of the corresponding partitioned region;
generate perimeter ranks along a boundary of the environment, at least one of the perimeter ranks interconnecting a first set of interior ranks in a first partitioned region and a second set of interior ranks in a second partitioned region; and
determine the path for the mobile robot using the parallel interior ranks of the number of the partitioned regions and the perimeter ranks.

17. The mobile robot of claim 14, wherein the controller is configured to update the determined path for the mobile robot in accordance with a user instruction of modifying the environment map.

18. A method of operating a mobile robot to traverse an environment, comprising:
receiving a map of the environment;
partitioning the environment map into regions;
determining, via at least one controller, an orientation of a region in a portion of the environment based at least on a dimension of the region, including determining, for each of a number of the partitioned regions, a corresponding orientation based at least on (1) a location of at least one neighboring region relative to the partitioned region, and (2) dimensional information of the at least one neighboring region, the orientation representing a direction for the mobile robot to traverse the corresponding region;
determining, via the at least one controller, a path for the mobile robot to traverse the portion of the environment using the determined orientation of the region, the path including a set of linear path segments connected by a number of turns therebetween, and the determination of the path reduces the number of turns in the path, wherein determining the path for the mobile robot is based on the orientations of the number of the partitioned regions; and
driving the mobile robot, via a drive system, to move along the determined path in the environment.

19. The method of claim 18, comprising:
decomposing each of the number of the partitioned regions into a set of parallel interior ranks each having a width substantially equal to a width of the mobile robot, the parallel interior ranks oriented in alignment with the orientation of the corresponding partitioned region; and
generating perimeter ranks along a boundary of the environment, at least one of the perimeter ranks interconnecting a first set of interior ranks in a first partitioned region and a second set of interior ranks in a second partitioned region;

wherein determining the path for the mobile robot is based on the parallel interior ranks of the number of the partitioned regions and the perimeter ranks.

20. The method of claim 18, further comprising:
receiving a user instruction via a user interface to modify the environment map or to specify a robot traversal direction or pattern; and
updating, via the at least one controller the determined path for the mobile robot in accordance with the user instruction.

* * * * *